United States Patent [19]

Tzikas et al.

[11] Patent Number: 4,900,813
[45] Date of Patent: Feb. 13, 1990

[54] FIBER-REACTIVE AZO DYES HAVING A 4,6-DIAMINOPYRIDINE COUPLING COMPONENT

[75] Inventors: Athanassios Tzikas, Pratteln; Kurt Burdeska, Basel, both of Switzerland

[73] Assignee: Ciba-Geigy Corporation, Ardsley, N.Y.

[21] Appl. No.: 210,537

[22] Filed: Jun. 23, 1988

[30] Foreign Application Priority Data

Jul. 2, 1987 [CH] Switzerland .................. 2510/87

[51] Int. Cl.$^4$ .................. C09B 62/08; C09B 62/24; C09B 62/507; C09B 62/523
[52] U.S. Cl. .................. 534/635; 534/591; 534/617; 534/632; 534/636; 534/641; 534/642; 534/643
[58] Field of Search ............ 534/635, 634, 636, 641, 534/642, 643

[56] References Cited

U.S. PATENT DOCUMENTS

| | | | |
|---|---|---|---|
| 3,598,801 | 8/1971 | Beffa et al. | 260/154 |
| 4,493,726 | 1/1985 | Burdeska et al. | 71/87 |
| 4,698,091 | 10/1987 | Brunner et al. | 71/87 |
| 4,709,018 | 11/1987 | Seitz | 534/635 |
| 4,754,023 | 6/1928 | Tzikas et al. | 534/618 |

FOREIGN PATENT DOCUMENTS

| | | |
|---|---|---|
| 174909 | 8/1984 | European Pat. Off. . |
| 214093 | 8/1985 | European Pat. Off. . |
| 208655 | 12/1985 | European Pat. Off. . |
| 3119349 | 12/1982 | Fed. Rep. of Germany ...... 534/636 |
| 3412668 | 10/1984 | Fed. Rep. of Germany ...... 534/635 |

*Primary Examiner*—Floyd D Hagel
*Assistant Examiner*—Fiona T. Powers

*Attorney, Agent, or Firm*—Edward McC. Roberts; Kevin T. Mansfield

[57] ABSTRACT

Novel reactive dyes particularly suitable for the dyeing and printing of cellulose-containing fiber materials which give, in combination with a high color yield, dyeings and prints having good fastness properties, said dyes having the formula

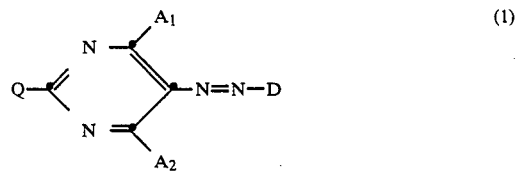

(1)

in which D is the radical of a diazo component, Q is a substituted or unsubstituted phenyl or naphthyl radical or a substituted or unsubstituted aromatic heterocyclic radical and $A_1$ and $A_2$ independently of one another are a radical of the formula

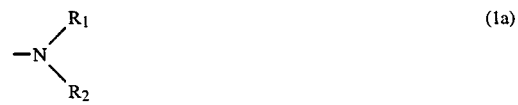

(1a)

in which $R_1$ and $R_2$ independently of one another are hydrogen, substituted or unsubstituted $C_1$–$C_6$alkyl or substituted or unsubstituted aryl, or $R_1$ and $R_2$ together with the N atom form a further substituted or unsubstituted heterocyclic 5- or 6-ring, with the proviso that at least one of the radicals $A_1$, $A_2$ and D has a fiber-reactive group.

19 Claims, No Drawings

FIBER-REACTIVE AZO DYES HAVING A 4,6-DIAMINOPYRIDINE COUPLING COMPONENT

Reactive dyes have been used for a long time to a large extent for the dyeing and printing of textiles made of fibre materials, and a large number of useful reactive dyes having different properties and various fields of application are nowadays available. However, the prior art is often not fully satisfactory due to the requirements of reactive dyeings which increase more and more in terms of economics, method of application and fastness level.

Thus, for example, it is frequently observed that the degree of fixation is too low and that the difference between degree of exhaustion and degree of fixation is too large (high soap loss), so that a significant amount of the reactive dye is lost to the dyeing process. Furthermore, in many cases the build-up leaves much to be desired.

The object of the present invention was to find novel improved reactive dyes having a high reactivity and good build-up properties and which can be dyed with a high fixation yield, which are suitable in particular for the exhaust dyeing method and which, on cellulose-containing fibre material, give wet- and lightfast dyeings.

It has been found that the novel reactive dyes defined below meet these requirements.

The invention relates to reactive dyes of the formula

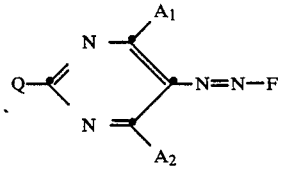
(1)

in which D is the radical of a diazo component, Q is a substituted or unsubstituted phenyl or naphthyl radical of a substituted or unsubstituted aromatic heterocyclic radical and $A_1$ and $A_2$ independently of one another are a radical of the formula

(1a)

in which $R_1$ and $R_2$ independently of one another are hydrogen, substituted or unsubstituted $C_1$–$C_6$ alkyl or substituted or unsubstituted aryl, or $R_1$ and $R_2$ together with the N atom form a further substituted or unsubstituted heterocyclic 5- or 6-ring, with the proviso that at least one of the radicals $A_1A_2$ and D has a fibre-reactive group.

D can be, for example, the radical of an aminobenzene, aminonaphthalene, phenylaza-aminobenzene, naphthylazo-aminobenzene, phenylazo-aminonaphthalene or naphthylazo-aminonaphthalene, each of which can be unsubstituted or, preferably, substituted as described below. Preferably, D is a substituted or unsubstituted radical of an aminobenzene or an aminonaphthalene.

Examples of suitable substituents on the radical D are: $C_1$–$C_4$alkyl, in general comprising methyl, ethyl, n- or isopropyl or n-, sec- or tert-butyl; $C_1$–$C_4$alkoxy, which is to be understood in general as meaning methoxy, ethoxy, n- or isopropoxy or n-, sec- or tert-butoxy; amino; N-mono- or N,N-di-$C_1$–$C_4$alkylamino, it being possible for the alkyl to be further substituted, for example, by —OH, —OCOCH$_3$, —OSO$_3$H, —CN or halogen, for example methylamino, ethylamino, n- or isopropylamino or n-, sec- or tert-butylamino, N,N-dimethylamino or N,N-diethylamino, β-chloroethylamino, β-cyanoethylamino, β-acetyloxyethylamino, N-(β-hydroxyethyl), N-ethylamino, β-sulfatoethylamino, N,N-di-(β-hydroxyethyl)amino, N,N-di-(β-sulfatoethyl)amino or hydroxypropylamino; phenylamino; $C_1$–$C_4$alkanoylamino, in particular acetylamino, propionylamino; benzoylamino; $C_1$–$C_4$alkoxycarbonyl, for example methoxycarbonyl or ethoxycarbonyl; nitro; cyano; trifluoromethyl; halogen, which is to be understood in general as meaning fluorine, chlorine and bromine; hydroxyl; carboxyl; sulfo; sulfomethyl; sulfamoyl; N-mono- or N,N-di-$C_1$–$C_4$alkylsulfamoyl; N-phenylsulfamoyl; carbamoyl; N-mono- or N,N-di-$C_1$–$C_4$alkylcarbamoyl; ureido; $C_1$–$C_4$alkylsulfonyl, for example methylsulfonyl or ethylsulfonyl.

In addition, D can have a reactive radical, for example a $C_2$–$C_4$alkanoyl or $C_2$–$C_4$alkylsulfonyl radical substituted by a detachable group or a detachable atom, a $C_2$–$C_4$alkenoyl or $C_2$–$C_4$alkenesulfonyl radical unsubstituted or substituted by a detachable atom or a detachable group and/or a radical containing carbocyclic or heterocyclic 5- or 6-membered rings substituted by a detachable atom or a detachable group, it being possible for the radicals mentioned to be linked directly or via a bridging link to the chromophore. The bridging link can consist, for example, of a functional group, for example an amino, carbonyl, carbonylamino, aminocarbonyl, sulfonyl, sulfonylamino or aminosulfonyl group or of an aliphatic, cycloaliphatic, aliphatic-heterocyclic, aromatic or mixed aliphatic-aromatic group which contains on of the functional groups mentioned.

One group of suitable reactive dyes according to the invention comprises compounds of the abovementioned formula (1), in which D has a reactive radical of the formula

—SO$_2$—Z, (2)

—W—alk-SO$_2$—Z, (2a)
|
R

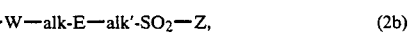
—W—alk-E—alk'—SO$_2$—Z, (2b)

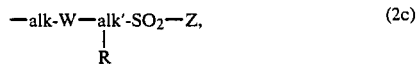
—alk-W—alk'—SO$_2$—Z, (2c)
|
R

—O—alk-W—alk'—SO$_2$—Z (2d)
|
R

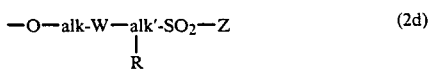

or

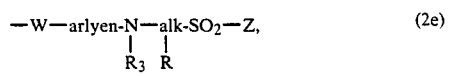
—W—arlyen-N—alk-SO$_2$—Z, (2e)
| |
R$_3$ R in which W is a functional group, for example —SO$_2$NR$_3$—, —CONR$_3$— or —NR$_3$CO—, R$_3$ is hydrogen, $C_1$–$C_4$alkyl, which is unsubstituted or substituted by hydroxyl, sulfo, sulfato, carboxyl or cyano, or is a radical

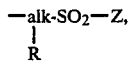

R is hydrogen, hydroxyl, sulfo, sulfato, carboxyl, cyano, halogen, $C_1$–$C_4$alkoxycarbonyl, $C_1$–$C_4$alkanoyloxy, carbamoyl or is the group —$SO_2$—Z, Z is —CH=$CH_2$ or —$CH_2$—$CH_2$—Y and Y is a leaving group, E is —O— or —$NR_4$—, $R_4$ is hydrogen or $C_1$–$C_4$alkyl, alk and alk' independently of one another are a $C_1$–$C_6$alkylene radical and arylene is, for example, a phenylene or naphthylene radical, which is unsubstituted or substituted, for example, by sulfo, carboxyl, $C_1$–$C_4$alkyl, $C_1$–$C_4$alkoxy and/or halogen.

Suitable leaving groups Y are for example —Cl, —Br, —F, —$OSO_3H$, —$SSO_3H$, —OCO—$CH_3$, —O—CO—$C_6H_5$, —$OPO_3H_2$, —OCO—$CCl_3$, —O—CO—$CHCl_2$, —OCO—$CH_2Cl$, $OSO_2$—R*, in which R* is $C_1$–$C_4$alkyl or phenyl unsubstituted or substituted by $C_1$–$C_4$alkyl, or —$OSO_2$—N($C_1$–$C_4$alkyl)$_2$.

Preferably, Y is a —Cl, —$OSO_3H$, —$SSO_3H$, —O—$COCH_3$, —OCO—$C_6H_5$ or —$OPO_3H_2$ group.

alk and alk' independently of one another are, for example, a methylene, ethylene, 1,3-propylene, 1,4-butylene, 1,5-pentylene or 1,6-hexylene radical or branched isomers thereof.

alk and alk' independently of one another are preferably a $C_1$–$C_4$alkylene radical and, in particular, preferably an ethylene radical.

R is preferably hydrogen or the group —$SO_2$—Z, in which Z is as defined above. Particularly preferably, R is hydrogen.

$R_3$ is preferably hydrogen, $C_1$–$C_4$alkyl or a group —alk—$SO_2$—Z, in which alk and Z are each as defined above.

arylene is preferably a 1,3- or 1,4-phenylene radical, which is unsubstituted or substituted, for example, by sulfo, methyl, methoxy or carboxyl.

E is preferably —NH— and, in particular, preferably —O—.

W is preferably a functional group —CONH— or —NHCO—.

Preferably, D contains a reactive radical of the abovementioned formula (2) or (2i), in which W is —CO—NH— or —NH—CO—, Z is in each case as defined above and alk is a $C_1$–$C_4$alkylene radical.

In another example of suitable reactive dyes of the formula (1) according to the invention, D contains a reactive radical of the formula

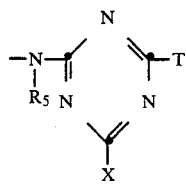
(3)

in which $R_5$ is hydrogen or $C_1$–$C_4$alkyl, which is unsubstituted or substituted by carboxyl, cyano, hydroxyl, sulfo or sulfate, X is a group detachable as an anion and T independently has either the meaning of X or is a grouping containing a further reactive radical or is a non-reactive substituent.

In this case, $R_5$ is preferably a $C_1$–$C_4$alkyl radical and, in particular, preferably hydrogen.

X is, for example, fluorine, chlorine, bromine, sulfo, $C_1$–$C_4$alkylsulfonyl or phenylsulfonyl and preferably fluorine or chlorine.

A non-reactive substituent T can be, for example a hydroxy, $C_1$–$C_4$alkoxy, $C_1$–$C_4$alkylthio, amino, N-$C_1$–$C_4$alkylamino or N,N-di-$C_1$–$C_4$alkylamino, in which alkyl is unsubstituted or substituted, for example, by sulfo, sulfato, hydroxyl, carboxyl or phenyl, a cyclohexylamino, morpholino, phenylamino, N-$C_1$–$C_4$alkyl, N-phenylamino or naphthylamino radical, in which phenyl or naphthyl is unsubstituted or substituted, for example, by $C_1$–$C_4$alkyl, $C_1$–$C_4$alkoxy, sulfo and/or halogen.

Examples of suitable non-reactive substituents T are amino, methylamino, ethylamino, β-hydroxyethylamino, N,N-di-β-hydroxyethylamino, β-sulfoethylamino, cyclohexylamino, morpholino, o-, m- or p-methylphenylamino, o-, m- or p-methoxyphenylamino, o-, m- or p-chlorophenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl, N-phenylamino, N-methyl, N-phenylamino, methoxy, ethoxy, n- or isopropoxy, hydroxyl.

T as a non-reactive substituent is preferably amino, N-$C_1$–$C_4$alkylamino, in which alkyl is unsubstituted or substituted by hydroxyl, sulfato or sulfo, morpholino, phenylamino or N-$C_1$–$C_4$alkyl, N-phenylamino, in which each phenyl is unsubstituted or substituted by sulfo, carboxyl, methyl or methoxy.

Where T independently is X, it is preferably chlorine or fluorine.

Where T is a group containing a further reactive radical, this group can correspond, for example, to the formula

(4)

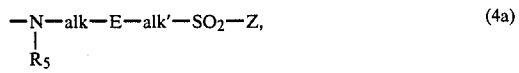
(4a)

(4b)

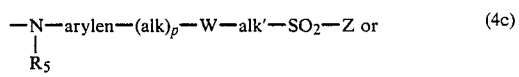
(4c)

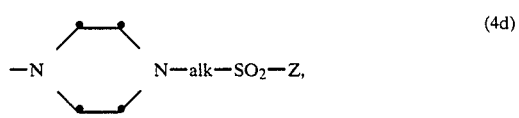
(4d)

in which R, $R_3$, $R_5$, E, W, Z, alk, alk' and arylene are as defined and preferred above and p is 0 or 1.

T as a group containing a further reactive radical corresponds preferably to one of the formulae given below

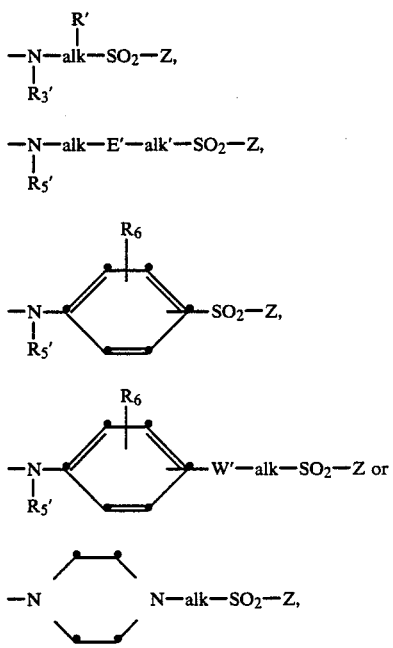

(4')
(4a')
(4b')
(4c')
(4d)

in which W' is —CONR$_5'$— or —NR$_5'$CO—, R' is hydrogen or the group —SO$_2$—Z, R$_3'$ is hydrogen, C$_1$-C$_4$alkyl or the group —alk—SO$_2$—Z, R$_5'$ is hydrogen or C$_1$-C$_4$alkyl, E' is —O— or —NH— and R$_6$ is hydrogen, sulfo, carboxyl, chlorine, methoxy or methyl, alk and alk' independently of one another are a C$_1$-C$_4$alkylene radical and Z is as defined and preferred above.

D having a reactive radical can be, for example, a pyrimidine or quinoxaline radical, each of which can have at least one group detachable as an anion. Examples are the 2,3-dichloroquinoxaline-6-carbonylamino radical, the 2,4-dichloropyrimidine-5-carbonylamino radical or a radical of the formula

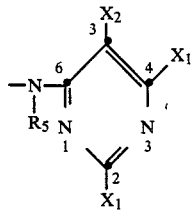

(5)

in which one of the radicals X$_1$, preferably the one in the 2-position, is a group detachable as an anion and the other radical X$_1$ is as defined for T under the formula (3), X$_2$ is an electronegative substituent and R$_5$ independently is as defined under the formula (3).

R$_5$ and T are as defined and preferred above; the radical X$_1$ detachable as an anion is preferably fluorine or chlorine; examples of suitable radicals X$_2$ are nitro, cyano, C$_1$-C$_4$alkylsulfonyl, carboxyl, chlorine, hydroxyl, C$_1$-C$_4$alkoxysulfonyl, C$_1$-C$_4$alkylsulfinyl, C$_1$-C$_4$alkoxycarbonyl or C$_1$-C$_4$alkanoyl, chlorine, cyano, formyl and methylsulfonyl being preferred definitions for X$_2$.

Examples of preferred reactive radicals of the formula (5) on the radical D are 2,4,5-trichloropyrimidin-6-amino, 2,4-difluoro-5-chloropyrimidin-6-amino, 2,4-dichloro-5-methylsulfonylpyrimidin-6-amino or a radical of the formula

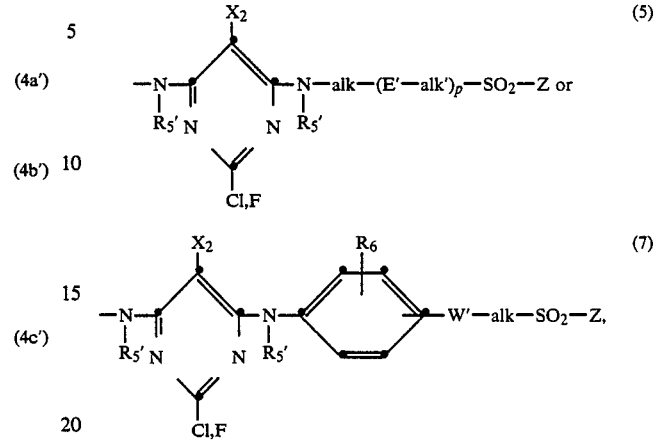

in which R$_5'$, E', W', R$_6$ and Z are as defined above, X$_2$ is chlorine, cyano or methylsulfonyl, p is the number 0 or 1 and alk and alk' independently of one another are a C$_1$-C$_4$alkylene radical.

D without a fibre-reactive group is preferably the radical of an aminobenzene or aminonaphthalene which is unsubstituted or substituted by sulfo, carboxyl, C$_1$-C$_4$alkoxy, C$_1$-C$_4$alkyl, C$_1$-C$_4$alkanoylamino and/or halogen.

D having a fibre-reactive group is preferably the radical of an aminobenzene or aminonaphthalene which is unsubstituted or substituted by sulfo, acetylamino, methyl, methoxy, chlorine or bromine and furthermore has a reactive radical of the abovementioned formula (2), (2a) or (3).

R$_1$ and/or R$_2$ in formula (1a) as a substituted or unsubstituted C$_1$-C$_6$-alkyl radical is, for example, a methyl, ethyl, n- or isopropyl, n-, sec- or tert-butyl or a straight-chain or branched pentyl or hexyl radical, it being possible for these radicals to be substituted, for example, by hydroxyl, sulfo, sulfato, carboxyl, cyano, halogen, C$_1$-C$_4$alkoxycarbonyl, C$_1$-C$_4$alkanoyloxy, carbamoyl and/or a reactive radical and additionally for the alkyl radical with the exception of methyl to be interrupted, for example, by a group —O— or —NR$_4$—: R$_4$ in this formula is as defined above.

In an alkyl radical R$_1$ and/or R$_2$ substituted by a reaction radical, the radical can be for example —SO$_2$—Z where Z is as defined above.

In a preferred embodiment of the reactive dyes according to the invention, R$_1$ and R$_2$ independently of one another are hydrogen or a C$_1$-C$_4$alkyl radical which is unsubstituted or substituted by hydroxyl, sulfo, sulfato, carboxyl, cyano or the group —SO$_2$—Z and/or is interrupted by —O—; preferably, one of the radicals R$_1$ or R$_2$ is hydrogen.

Examples of particularly preferred non-reactive alkylamino radicals A$_1$ and A$_2$ are:

—NH—CH$_3$, —NH—CH$_2$—SO$_3$H, —NH—CH$_2$—COOH,

—NH—C$_2$H$_5$, —NH—CH$_2$—CH$_2$—OH,

—NH—CH$_2$—CH$_2$—SO$_3$H, —NH—CH$_2$—CH$_2$—OSO$_3$H,

—NH—CH$_2$—CH$_2$—CN, —NH—CH$_2$—CH$_2$—COOH,

—NH—CH$_2$—CH$_2$—CH$_2$—OSO$_3$H,

—NH—CH$_2$—CH$_2$—CH$_2$—OH,

—NH—CH$_2$—CH(OH)—CH$_2$—CH$_3$,

—NH—CH$_2$—CH$_2$—O—CH$_2$—CH$_2$—OH,

—NH—CH$_2$—CH$_2$—O—CH$_2$—CH$_2$—OSO$_3$H.

Examples of preferred reactive alkylamino radicals A$_1$ and A$_2$ are the abovementioned radicals of the formulae (4) or (4a) and in particular the radicals of the formulae (4') or (4a').

R$_1$ and R$_2$ forming a heterocyclic radical together with a nitrogen atom to which both are bonded can be, for example, a piperidinyl, piperazinyl or pyrrolidinyl radical, each of which is unsubstituted or substituted, for example, by a reactive radical of the formula —(alk)$_p$—SO$_2$—Z, in which alk, p and z are each as defined above. A non-reactive radical is preferably the piperidinyl radical and a reactive radical is preferably a radical of the abovementioned formula (4d).

Aryl radicals R$_1$ or R$_2$ can be, for example, a phenyl or naphthyl radical, which is unsubstituted or substituted, for example, by sulfo, carboxyl, C$_1$-C$_4$alkyl, C$_1$-C$_4$alkoxy, halogen, a reactive radical and/or a group —N=N—K, in which K is the radical of a coupling component of the benzene or naphthalene series or of the heterocyclic series.

In this formula, K is preferably a radical of a benzene, naphthalene, pyrazolone, 1-phenyl-5-pyrazolone or a pyridone, which is substituted, for example by one or more identical or different substituents chosen from those mentioned above for D.

K corresponds particularly preferably to one of the formulae listed below:

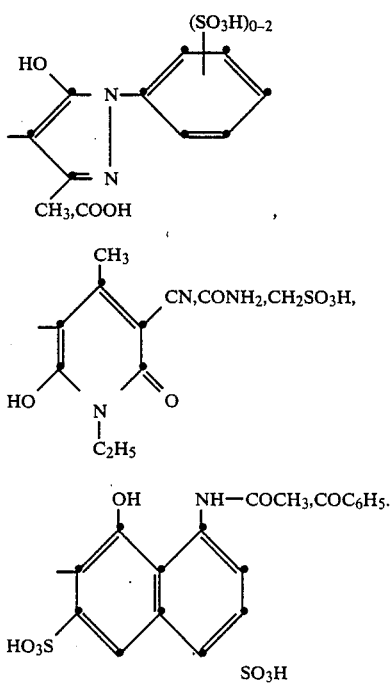

In an aryl R$_1$ or R$_2$ having a reactive radical, said radical can be of the abovementioned formula (2), (2a), (3) or (5) or can be a 2,3-dichloroquinoxaline-6-carbonylamino or 2,4-dichloropyrimidine-5-carbonylamino radical.

A non-reactive aryl radical A$_1$ and/or A$_2$ corresponds, for example, to the formula

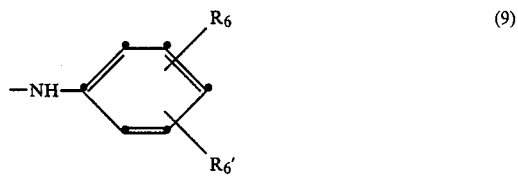

in which R$_6$ is hydrogen, sulfo, chlorine, methoxy or carboxyl and R$_6'$ independently has the definition of R$_6'$ or is a group of the abovementioned formula (8).

Preferred reactive aryl radicals A$_1$ and A$_2$ are the groups of the abovementioned formulae (4b') or (4c') or a group of the formula

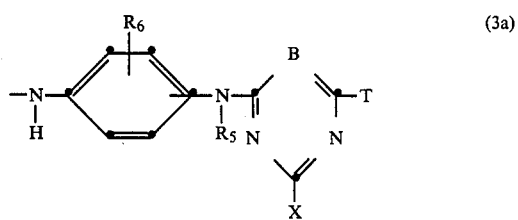

in which R$_5$, R$_6$, X and T are each as defined above and B is

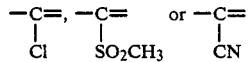

and in particular —N=.

A preferred group of reactive dyes according to the invention comprises compounds of the formula (1) in which A$_1$ and A$_2$ independently of one another are amino, N—C$_1$-C$_4$alkylamino, in which the alkyl is unsubstituted or substituted by hydroxyl, sulfato or sulfo, or phenylamino, in which the phenyl is unsubstituted or substituted by sulfo, carboxyl, methyl, methoxy, chlorine and/or by a radical of the formula

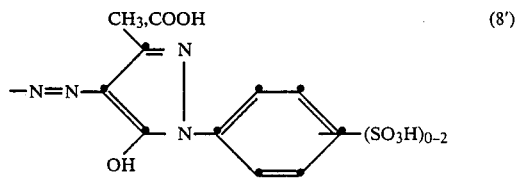

A further group of preferred reactive dyes according to the invention comprises compounds of the formula (1) in which A$_1$ is a radical of the abovementioned formula (1a), (4') or (4a'), in which R$_1$ is hydrogen and R$_2$ is hydrogen or C$_1$-C$_4$alkyl unsubstituted by hydroxyl, sulfo or sulfato, R', R$_3'$ and R$_5'$ are each hydrogen, E' is —O— and alk, alk' and Z are each as defined above, and A$_2$ independently has the definition of A$_1$ or is phenylamino unsubstituted or substituted by sulfo, chlorine, methoxy, carboxyl or a radical of the abovementioned formula (2), (2a) or (3).

A phenyl radical Q can be phenyl unsubstituted or substituted, for example, by $C_1$–$C_4$alkyl, $C_1$–$C_4$alkoxy, halogen, nitro, cyano, $C_1$–$C_4$alkoxycarbonyl, $C_1$–$C_4$alkylsulfonyl, sulfo or trihalomethyl. Preferably, the phenyl radical is unsubstituted or substituted by methyl, isopropyl, methoxy, sulfo, nitro, chlorine, bromine or trifluoromethyl. Particularly preferably, Z is an unsubstituted phenyl radical.

A naphthyl radical Q can be, for example, an unsubstituted 1- or 2-naphthyl radical.

An aromatic-heterocyclic radical Q can be, for example, a furanyl, thienyl, thiazolyl, oxazolyl, isothiazolyl, benzothiazolyl, benzoisothiazolyl, pyrazolyl, imidazolyl, 1,2,3-triazolyl, 1,2,4-triazolyl, 1,2,4-thiadiazolyl, 1,3,4-thiadiazolyl or 1,3,5-triazine radical. These radicals can be unsubstituted or substituted, for example, by $C_1$–$C_4$alkyl, nitro, cyano, $C_1$–$C_4$alkoxycarbonyl or $C_1$–$C_4$alkylthio.

Preferably, an aromatic-heterocyclic radical Q is an unsubstituted furanyl, thienyl or benzothiazolyl radical.

A particularly preferred embodiment of the dyes according to the invention relates to compounds of the formula (1) in which Q is a phenyl radical.

The compounds of the formula (1) can be prepared in a manner known per se, for example by reacting a diazo component of the formula

D—NH$_2$      (10)

or its precursor with a compound of the formula

(11)

or its precursor by diazotization and coupling to give reactive dyes of the formula (1), or by converting the intermediate obtained to the desired final dyes and, if desired, by adding on another conversion reaction; in these reactions, D, A$_1$, A$_2$ and Q are as defined and preferred above.

Diazotization of the compounds of the formula (10) and coupling with the compounds of the formula (11) are each carried out by conventional methods.

The compounds of the formula (10) which do not have a reactive radical are known or can be prepared by methods known per se. The compounds of the formula (10) which do not have a reactive radical are known, for example, from European patent application Nos. 144,766, 174,909, 208,655 or 214,093 or can be prepared analogously.

Some of the compounds of the formula (11) are novel; they can be prepared, for example, by reacting a compound of the formula

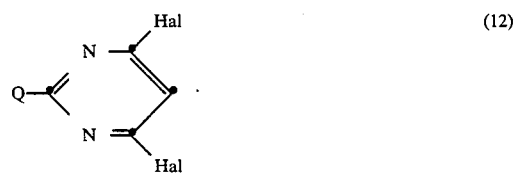

(12)

with an amine of the formula

(1a*)

to give the compound of the formula

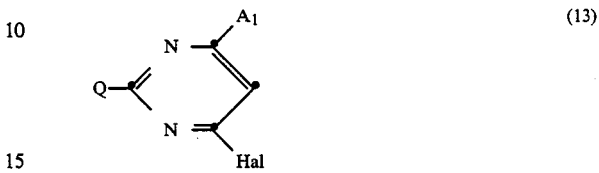

(13)

and subsequently reacting this compound with another amine of the formula (1a*) to give the compound of the formula (11). In formulae (12), (1a*) and (13), Q, R$_1$, R$_2$ and A$_1$ have each of the abovementioned definition and Hal is halogen, for example bromine and in particular chlorine.

The reaction of the compounds (12) and (1a*) is preferably carried out in a polar solvent, which can be, for example, $C_1$–$C_4$alkanols, for example methanol or ethanol, glycols and glycol ethers such as ethylene glycol or ethylene glycol monomethyl or dimethyl ether, formamides such as N,N-dimethylformamide and in particular water; mixtures of several solvents are also suitable. The reaction temperature is about 50° to 150° C. and, preferably, 60° to 100° C.

The components of the formulae (12) and (1a*) can be used in a stoichiometric ratio, but often it is more advantageous to use an excess of component (1a*).

The reaction of the compounds of the formula (13) with another amine of the formula (1a*) is preferably carried out in one of the abovementioned solvents at a temperature above 100° C. The temperature is usually between 120° and 250° C. and, preferably, between 140° and 200° C. This reaction step can be carried out in an open vessel under atmospheric pressure or, preferably, in a sealed vessel (autoclave) under internal pressure. The components (13) and (1a*) can be used in stoichiometric amounts; however, the amine of the formula (1a*) is preferably present in a 1- to 5-fold excess, based on the compound of the formula (13).

The amines of the formula (1a*) from which the radicals A$_1$ and A$_2$ in formula (11) are derived can be identical or different.

Where A$_1$ and A$_2$ are radicals of different amines, it is preferred to select the two-step route described above for the synthesis of the compounds of the formula (11) and use the components in about stoichiometric amounts; however, often it is more advantageous to use an excess of the amine of the formula (1a*).

Where A$_1$ and A$_2$ are each the radical of an identical amine, the compounds of the formula (11) can be advantageously prepared in one step by reacting the compound of the formula (10) with an appropriate excess of amine of the formula (1a*).

The compounds of the formula (12) are known, for example from EP-A 55,693 or EP-A 96,657 or can be prepared analogously.

Compounds of the formula (1a*) which do not have a reactive radical are also known or can be prepared in a manner known per se. Amines of the formula (1a*), which do not have a reactive radical are known, for example, from the abovementioned EP-A 144,766, 174,909, 208,655 or 214,093 or can be prepared analogously.

Instead of the diazo component of the formula (10) and/or the coupling component of the formula (11), appropriate precursors can, if desired, be used for the preparation of the compounds of the formula (1) and the preparation of the final dye is completed by a further diazotization and/or coupling or any other conversion reaction with the intermediate.

A modified embodiment of the process consists in first preparing a dye which contains a precursor of the reactive radical and converting this precursor afterwards to the final stage, for example by esterification or an addition reaction. For example, a dye in which Z is a radical HO—CH$_2$CH$_2$— can be prepared and the intermediate reacted with sulfuric acid before or after the acylation to convert the hydroxyl group into the sulfato group; or, an analogous dye can be used in which Z is the group H$_2$C=CH— and thiosulfuric acid is added to the intermediate, forming a radical HO$_3$SS-—CH$_2$CH$_2$—. Sulfonation of the hydroxyl group in a dye of the formula (1) or a suitable precursor is carried out, for example, by reaction with concentrated sulfuric acid at 0° C. to a moderately elevated temperature. The sulfonation can also be carried out by reaction of the hydroxyl compound with two equivalents of chlorosulfonic acid per hydroxyl group in a polar organic solvent, for example N-methylpyrrolidone, at 10° to 80° C. Preferably, the sulfonation is carried out by stirring the appropriate compound into sulfuric acid monohydrate at temperatures between 5° and 15° C. The incorporation of similar groups, for example a thiosulfato or phosphato group, is carried out in a manner known per se.

In addition, elimination reactions can be performed following the synthesis. For example, reactive dyes of the formula (1) which contain sulfatoethylsulfonyl radicals can be treated with reagents which eliminate hydrogen halide such as sodium hydroxide, which results in conversion of the sulfatoethylsulfonyl radicals to vinylsulfonyl radicals.

The invention further relates to compounds of the abovementioned formula (11) in which Q, A$_1$ and A$_2$ are each as defined above, with the proviso that A$_1$ and/or A$_2$ contain a reactive radical. Suitable reactive radicals are apparent, for example, from the description given above.

The dyes of the formula (1) are fibre-reactive. Fibre-reactive dyes are to be understood as meaning those which are capable of reacting with the hydroxyl groups of cellulose or with the reactive centres of natural or synthetic polyamides with the formation of covalent chemical bonds.

The reactive dyes of the formula (1) according to the invention are suitable for dyeing and printing a very wide variety of materials, such as silk, leather, wool, polyamide fibres and, in particular, cellulosecontaining fibre materials of any kind. Such fibre materials are for example the natural cellulose fibres such as cotton, linen and hemp, and also cellulose pulp and regenerated cellulose. The reactive dyes according to the invention are also suitable for dyeing or printing hydroxylcontaining fibres which are present in blend fabrics, for example mixtures of cotton with polyester fibres or polyamide fibres.

The dyes according to the invention can be applied to and fixed on the fibre in various ways, in particular in the form of aqueous dye solutions and print pastes. They are suitable not only for the exhaust method of dyeing but also for dyeing by the pad-mangling method, whereby the material is impregnated with aqueous, possibly salt-containing dye solutions and the dyes are fixed after an alkali treatment or in the presence of alkali, if desired, by heating. They are particularly suitable for the cold pad-batch process, whereby the dye is applied together with the alkali on a pad-mangle and is then fixed by storing for several hours at room temperature. After fixing, the dyeings and prints are thoroughly rinsed with cold and hot water, in the presence or absence of an agent which has a dispersing action and promotes the diffusion of the unfixed portions.

The reactive dyes of the formula (1) according to the invention are distinguished by a high reactivity, good fixing properties and good build-up properties. They can therefore be used for exhaustive dyeing at low dyeing temperatures and require only short steaming times in the pad-steam process. The degrees of fixation are high, and the unfixed portions can easily be washed off, the difference between the degree of exhaustion and the degree of fixation being remarkably small, i.e. the hydrolysis loss being very small. The reactive dyes of the formula (1) according to the invention are also suitable for printing, in particular on cotton, but also for printing nitrogen-containing fibres, for examples wool, silk or wool-containing or silk-containing blend fabrics.

The dyeings and prints prepared with the dyes according to the invention on cellulose fibre materials have a high tinctorial strength and high fibre-dye bond stability, not only in the acid but also in the alkaline range, and also a good lightfastness and very good wet-fastness properties, such as wash, water, seawater, cross-dyeing and perspiration fastness properties, and also a good pleating fastness, hot press fastness and rub fastness. In particular, the very good chlorinated water fastness of the reactive dyes according to the invention should be emphasized; furthermore, the compounds of the formula (1) exhibit virtually no phototropic effect.

The examples which follow serve to illustrate the invention. The temperatures are given in degrees celsius, and parts and percentages are by weight, unless otherwise stated. Parts by weight relate to parts by volume as the kilogram relates to the liter.

EXAMPLE 1

The solution of 28.1 parts of 2-(4'-amino-phenylsulfonyl)-ethyl hydrogensulfate diazotized in the presence of hydrochloric acid is added at 0° to 10° C. and at pH of 6 to 7 to a solution of 43.4 parts of 4,6-bis(2'-sulfatoethylamino)-2-phenylpyrimidine and coupled. The yellow monoazo dye is isolated, it corresponds to the formula

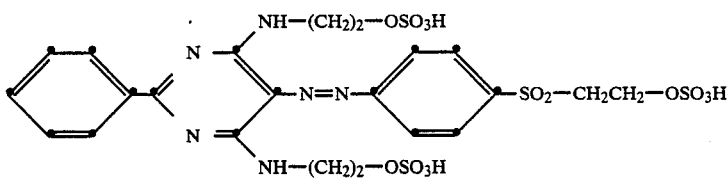

and dyes cellulose fibres in golden yellow shades.

EXAMPLE 2

The dye mentioned in Example 1 is vinylated at room temperature and a pH of 10 for 30 minutes. The pH is brought back to 6.0 with hydrochloric acid. The monoazo dye is isolated, it corresponds to the formula

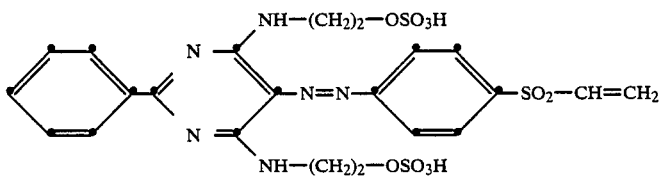

EXAMPLE 3

33.6 g of the primary condensation product from 1 mol of cyanuric chloride and 1 mol of 1,3-diaminobenzene-4-sulfonic acid are stirred into 300 ml of water, 300 g of ice and 30 ml of 30% hydrochloric acid and diazotized at 0° to 5° C. with 6.9 g of sodium nitrite. The resulting Congoacid diazonium suspension is brought to a pH of 6.5 with sodium carbonate solution and then added to a solution of 43 g of 4,6-bis(2'-sulfatoethylamino)-2-phenylpyrimidine in 900 ml of water and 20 g of sodium carbonate. After the coupling is completed, the dye is precipitated by adding sodium chloride, filtered, washed with sodium chloride solution and dried at 40° C. in vacuo. The monoazo dye of the formula

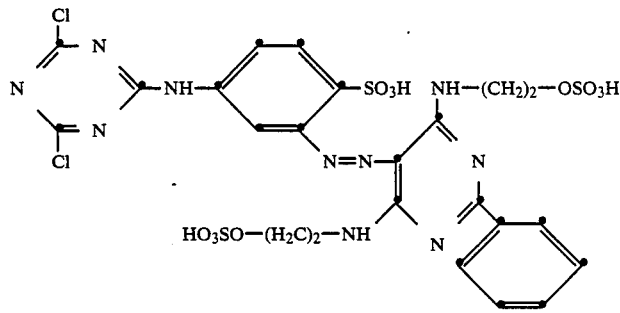

thus obtained dyes cellulose fibres in yellow shades.

EXAMPLE 4

33.6 g of the primary condensation product from 1 mol of cyanuric chloride and 1 mol of 1,3-diaminobenzene-4-sulfonic acid are stirred into 300 ml of water, 300 g of ice and 30 ml of 30% hydrochloric acid and diazotized at 0° to 5° C. with 6.9 g of sodium nitrite. The resulting Congoacid diazonium suspension is brought to a pH of 6.5 with sodium carbonate solution and then added to a solution of 43 g of 4,6-bis(2'-sulfatoethylamino)-2-phenylpyrimidine in 900 ml of water and 20 g of sodium carbonate. After the coupling is completed, 22.4 g of β-(β'-chloroethylsulfonyl)ethylamine hydrochloric are added, and the reaction solution is allowed to condense for 3 hours at room temperature and a pH of 7.0–7.5. The dye is precipitated by adding sodium chloride, filtered, washed with sodium chloride solution and dried at 40° C. in vacuo. The monoazo dye of the formula

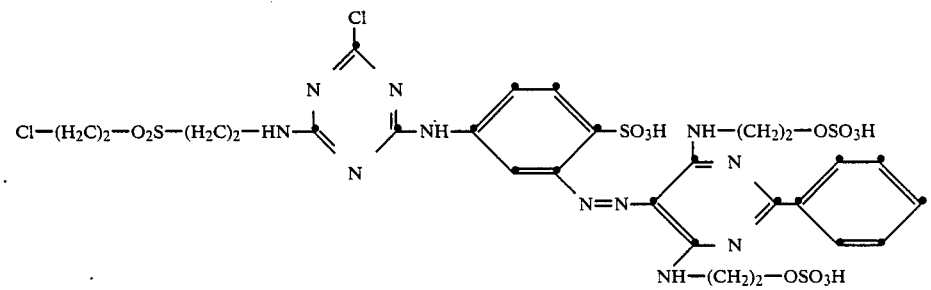

thus obtained dyes cellulose fibres in yellow shades having very good fastness properties.

EXAMPLE 5

23 g of 1-acetylamino-3-aminobenzene-4-sulfonic acid are dissolved in 200 ml of water under neutral conditions and diazotized with 6.9 g of sodium nitrite and 30 ml of 30% hydrochloric acid at 0° to 5° C. The resulting Congo-acid diazo suspension is brought to a pH of 4.5 with sodium carbonate solution and then added to a solution of 34.2 g of 4-amino-6-(3'-sulfophenylamino)-2-phenylpyrimidine in 800 ml of water and 15 g of sodium bicarbonate. After the coupling is completed, sodium hydroxide is added to the dye solution to make a 5% sodium hydroxide solution, and the mixture is heated to 70° to 80° C. until the acetylamino group is completely hydrolyzed. The reaction solution is then cooled, neutralized with concentrated hydrochloric acid and the dye is precipitated completely by adding sodium chloride. After filtration and washing with dilute sodium chloride solution, the aminomonoazo dye thus obtained is dissolved in 400 ml of water. To this dye solution is added dropwise at 70° C. a solution of 21 g of 2,4,5,6-tetrachloropyrimidine in 50 ml of acetone, while maintaining the pH at 6 to 7 by simultaneous addition of sodium carbonate solution. After the condensation is completed, the dye is precipitated by adding sodium chloride, filtered and washed with sodium chloride solution. Drying in vacuo gives the monoazo dye of the formula

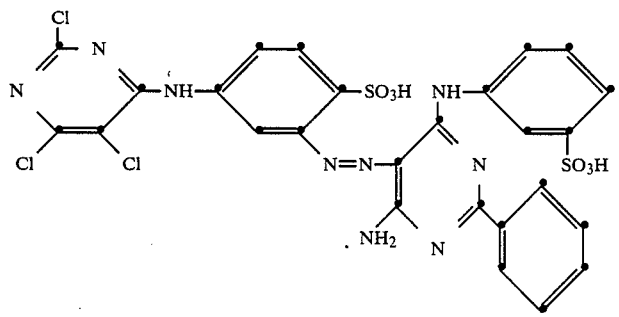

which dyes cellulose fibres in yellow shades.

EXAMPLE 6

35.7 g of 4-amino-6-(3'-amino-4'-sulfophenylamino)-2-phenylpyrimidine are dissolved in 1,000 ml of water at a pH of 8, after which the solution is cooled to 0° to 5° C. At this temperature, a solution of 24 g of 2,4-dichloropyrimidine-5-carbonyl chloride in 100 ml of acetone is added dropwise over 30 minutes, and the pH of the reaction mixture is maintained at 7 to 8 by adding sodium carbonate solution. As soon as no more unchanged amino compound can be detected, the reaction mixture is treated with 30 g of sodium bicarbonate, and a solution of 17.3 g of diazotized 1-aminobenzene-2-sulfonic acid is poured in. After the coupling is completed, the reaction mixture is cleared, the reaction solution is then treated with sodium chloride, the precipitated dye is filtered off and washed with sodium chloride solution. Drying in vacuo at 40° C. gives the monoazo dye of the formula

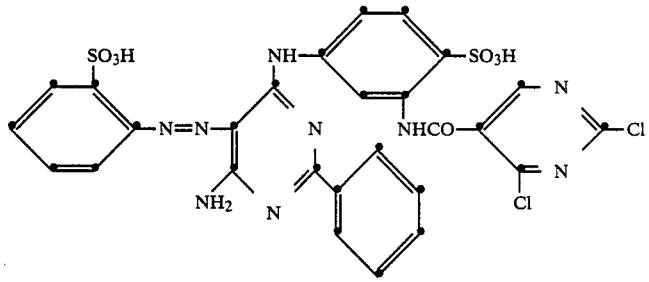

which dyes cellulose fibres in yellow shades.

EXAMPLE 7

54.1 g of the dye of the formula

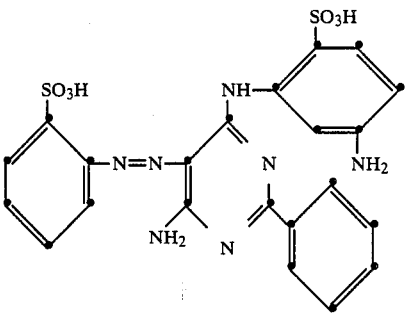

obtained by coupling of diazotized 1-aminobenzene-2-sulfonic acid with 4-amino-6-(3'-amino-6'-sulfophenylamino)-2-phenylpyrimidine) are dissolved in 1,000 ml of water under neutral conditions. To this dye solution is added dropwise at 0° to 10° C. a solution of 23 g of 2,4-dichloropyrimidine-5-carbonyl chloride in 50 ml of acetone and the pH is maintained at 6 by simultaneous addition of sodium carbonate solution. The reaction mixture is stirred until no more diazotizable amino groups can be detected, 12.6 g of sodium sulfite is added at room temperature and the mixture is stirred until the pH no longer changes. The newly formed dye is salted out with sodium chloride, filtered off, washed with sodium chloride solution and dried at 40° to 50° C. in vacuo.

This gives the monoazo dye of the formula

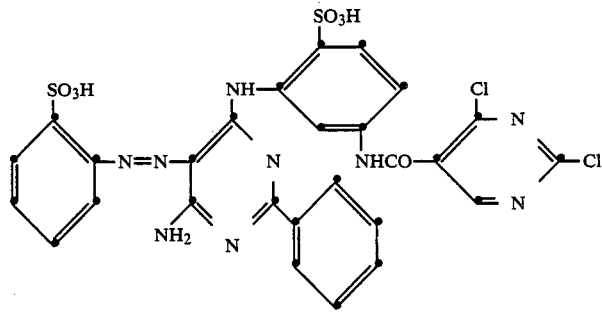

which dyes cotton in wetfast yellow shades by the process customary for reactive dyes.

EXAMPLE 8

67.1 g of the aminoazo dye of the formula

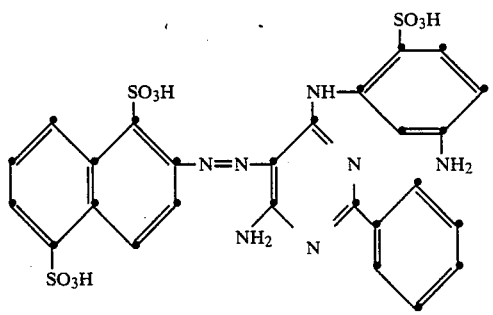

(obtained by coupling of diazotized 2-naphthylamine-1,5-disulfonic acid with 4-amino-6-(3'-amino-6'-sulfophenylamino)-2-phenylpyrimidine) are dissolved as the sodium salt in 1,000 ml. of water under neutral conditions. To this dye solution is added at 40° C. a solution of 29 g of 2,3-dichloroquinoxaline-6-carbonyl chloride in 50 ml of acetone, and the pH is maintained at 7 by simultaneous addition of sodium carbonate solution. After the condensation is completed, the dye is precipitated by adding sodium chloride, filtered off and washed with sodium chloride solution. Drying in vacuo at 40° C. gives the monoazo dye of the formula

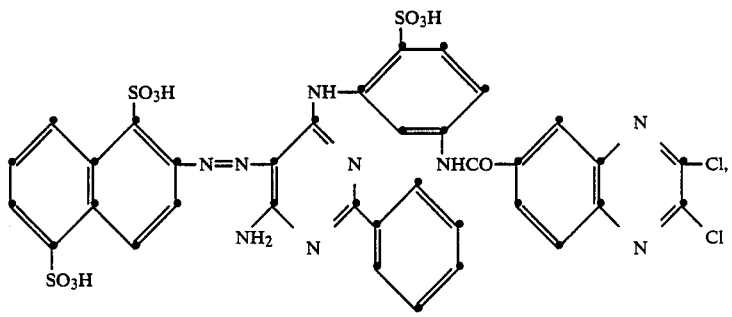

which dyes the cellulose fibres in golden yellow shades.

EXAMPLE 9

38.3 g of 2-naphthylamine-1,5,7-trisulfonic acid are dissolved in 300 ml of water under neutral conditions and diazotized at 0° to 5° C. with 25 ml of 30% hydrochloric acid and 6.9 g of sodium nitrite. The diazonium solution buffered with sodium carbonate to a pH of 4.5 is then added to a suspension of 40.2 g of 4-cyclohexylamino-6-(3'-nitrophenylamino)-2-phenylpyrimidine in 900 ml of water and 20 g of sodium bicarbonate. After the coupling is completed, the pH of the dye solution is increased to 9 and a solution of 14 g of sodium sulfide in 100 ml of water is then added dropwise at 70° to 80° C. The reduction is carried out at this temperature until no more nitro compound can be detected, the cooled dye solution is treated with 40 g of sodium bicarbonate and freed from precipitated sulfur. The dye is completely precipitated by adding sodium chloride, filtered off, washed with sodium chloride solution and then again dissolved in 700 ml of water. After adding 20 g of 2,4,5,6-tetrachloropyrimidine, the mixture is heated to 80° to 90° C. and the condensation is carried out at this temperature until no more free amino groups can be detected. After cooling, the novel dye is completely precipitated by adding sodium chloride, filtered off, washed with sodium chloride solution and dried in vacuo at 60° to 70° C. This gives the monoazo dye of the formula

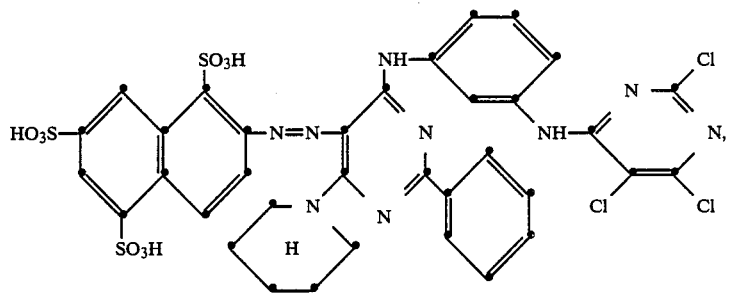

which dyes cellulose fibres in golden yellow shades.

EXAMPLE 10

68.4 g of the aminomonoazo dye of the formula

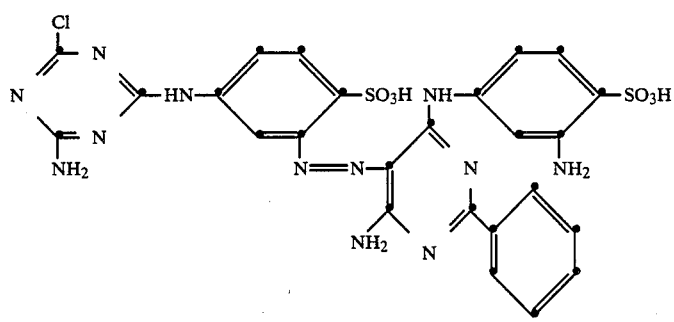

(obtained by coupling of diazotized 1-amino-3-[2'-chloro-4'-aminotriazinyl-6'-amino]-benzene-6-sulfonic acid with 4-amino-6-(3'-amino-4'-sulfophenylamino)-2-phenylpyrimidine) are suspended in 1,000 ml of water and diazotized at 0° to 10° C. with 30 ml of 30% hydrochloric acid and 6.9 g of sodium nitrite. The resulting diazonium suspension is then poured to a solution of the sodium salt of 25.4 g of 1-(4'-sulfophenyl)-3-methyl-5-pyrazolone in 200 ml of water and 30 g of sodium bicarbonate. After the coupling is completed, the dye is precipitated by adding sodium chloride, filtered off and washed with dilute sodium chloride solution.

Drying in vacuo at 40° C. gives the bisazo dye of the formula

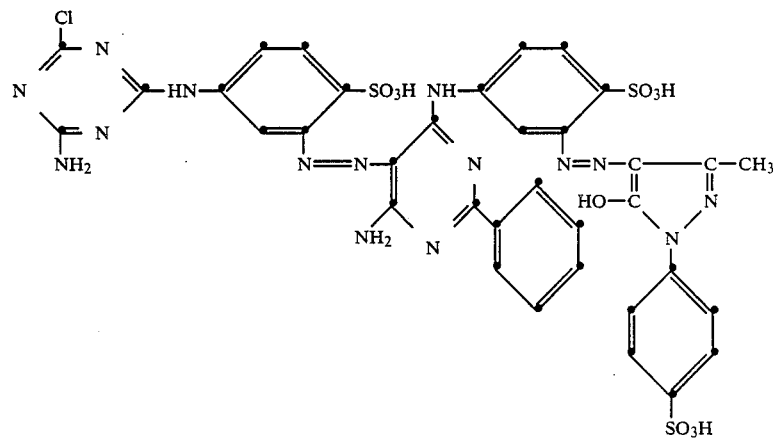

which dyes cellulose fibres in yellow shades.

EXAMPLES 11-132

Analogously to Examples 1-10, the dyes listed in Table 1 which follows are obtained; these dyes dye cotton in the shade listed in each case.

TABLE 1

| Example No. | | Shade |
|---|---|---|

TABLE 1-continued
| 11 | 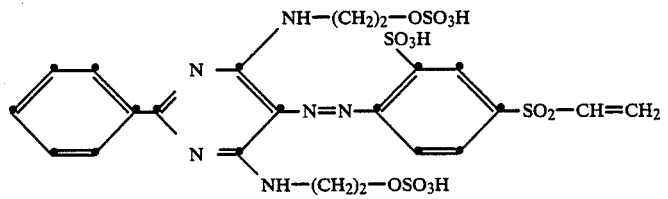 | Yellow |
| 12 | 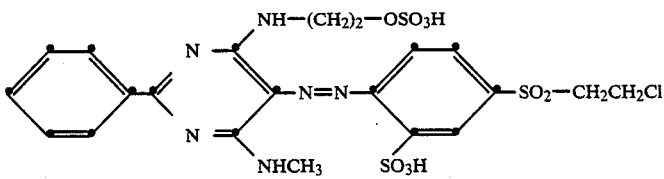 | Yellow |
| 13 | 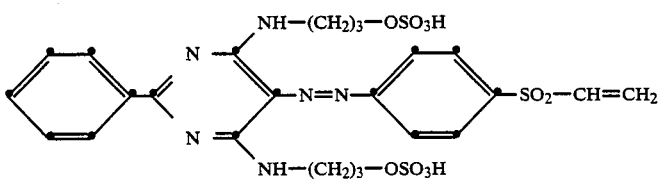 | Yellow |
| 14 | 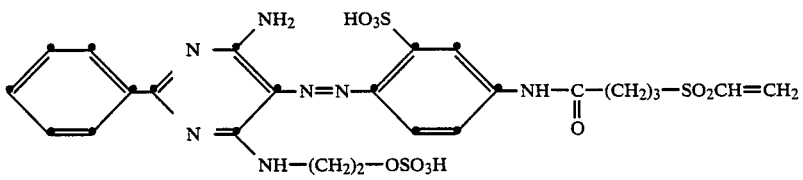 | Yellow |
| 15 | 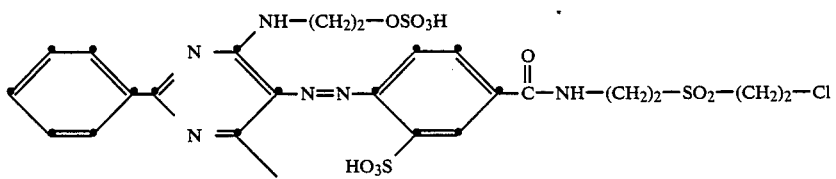 | Yellow |
| 16 | 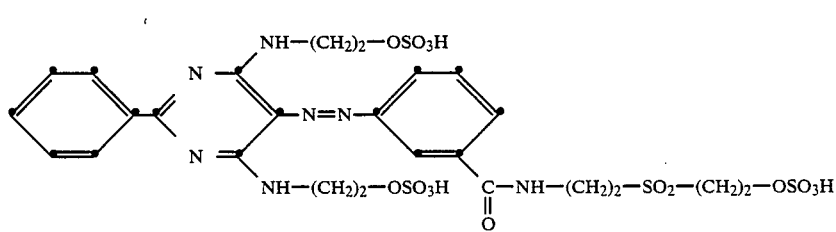 | Yellow |
| 17 | 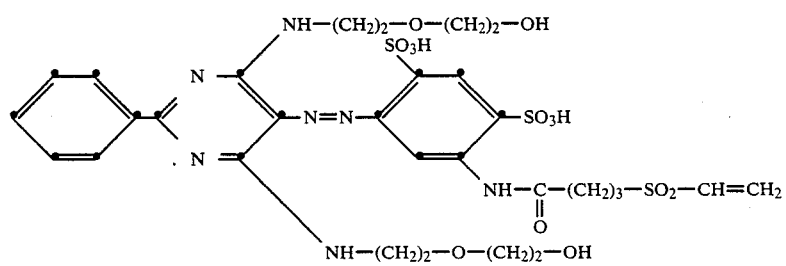 | Yellow |

TABLE 1-continued

| No. | Structure | Color |
|---|---|---|
| 18 | Phenyl−C(NH₂)=N−N=... with pyrazine-like core bearing NH₂ and NH−C₂H₅, azo-coupled to benzene ring substituted with SO₃H, SO₃H, and NH−C(=O)−(CH₂)₃−SO₂−CH=CH₂ | Yellow |
| 19 | Phenyl core with NH−(CH₂)₂−OH and NH−(CH₂)₂−OH substituents, azo-coupled to benzene ring with SO₃H, SO₃H, and NH−C(=O)−[benzene with NH−(CH₂)₃−SO₂−CH=CH₂] | Yellow |
| 20 | Phenyl core with NH−(CH₂)₂−OSO₃H substituents (×2), azo-coupled to benzene ring with SO₃H and NH−C(=O)−(CH₂)₃−SO₂CH=CH₂ | Yellow |
| 21 | Phenyl core with NH−(CH₂)₂−OSO₃H substituents (×2), azo-coupled to benzene ring with SO₃H and NH−C(=O)−(CH₂)₃−SO₂−(CH₂)₂−Cl | Yellow |
| 22 | Phenyl core with NH−(CH₂)₃−OSO₃H substituents (×2), azo-coupled to benzene ring with C(=O)−NH−(CH₂)₂−SO₂−CH=CH₂ | Golden yellow |
| 23 | Phenyl core with NH−(CH₂)₂−OSO₃H and NH−C₂H₅, azo-coupled to naphthalene with SO₃H and SO₂−(CH₂)₂−OSO₃H | Golden yellow |
| 24 | Phenyl core with NH−(CH₂)₃−OSO₃H and NH₂, azo-coupled to naphthalene with SO₃H and SO₂−CH=CH₂ | Golden yellow |

TABLE 1-continued
| 25 | 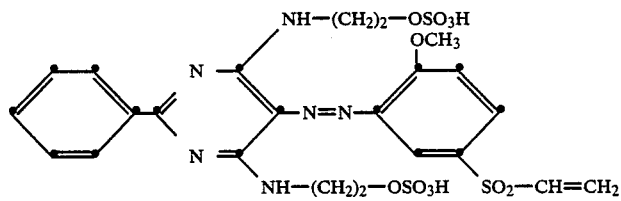 | Orange |
| 26 | 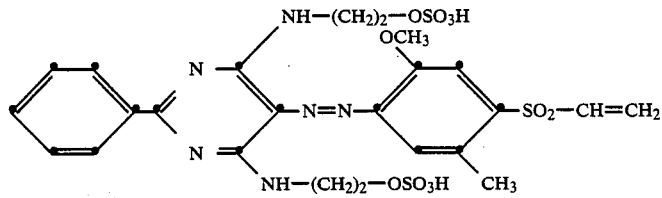 | Orange |
| 27 | 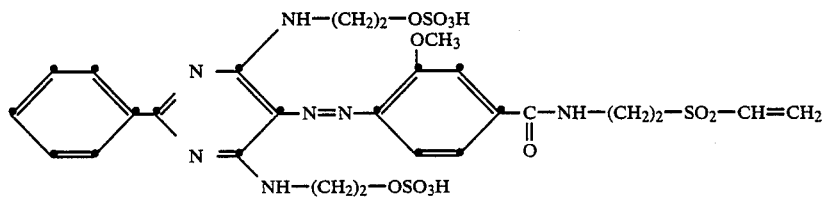 | Orange |
| 28 | 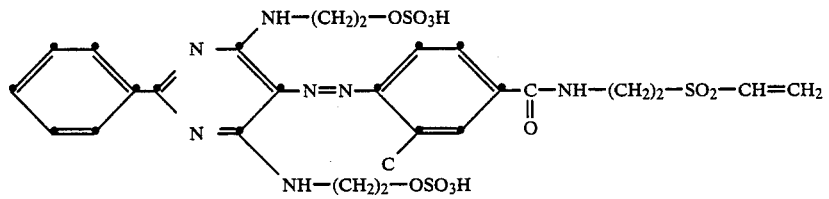 | Golden yellow |
| 29 | 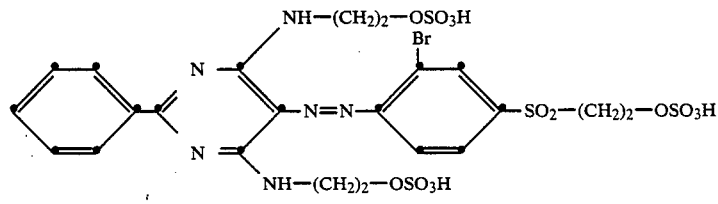 | Yellow |
| 30 | 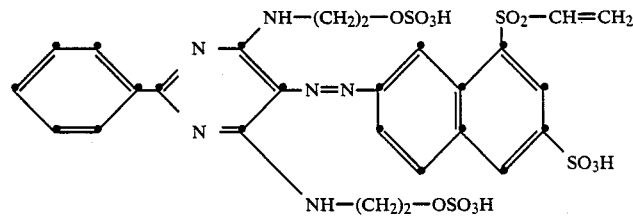 | Orange |
| 31 | 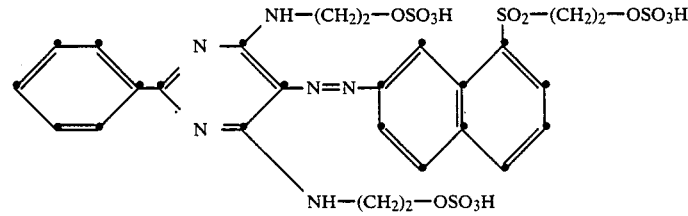 | Orange |

TABLE 1-continued
| | | |
|---|---|---|
| 32 | 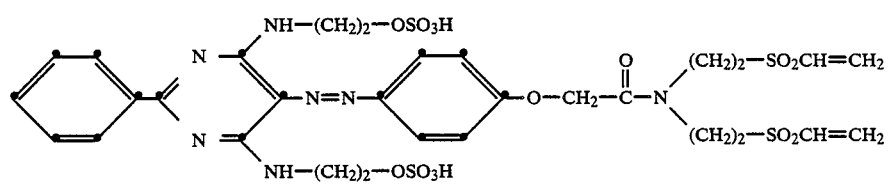 | Golden yellow |
| 33 | 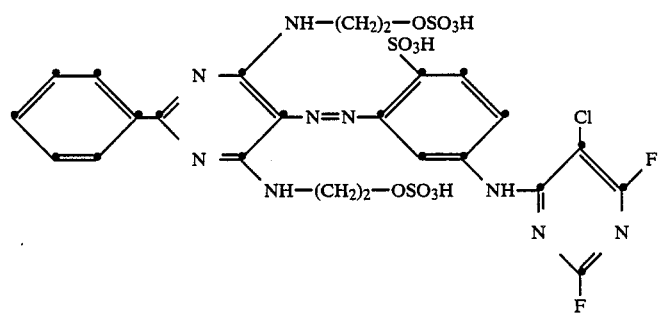 | Golden yellow |
| 34 | 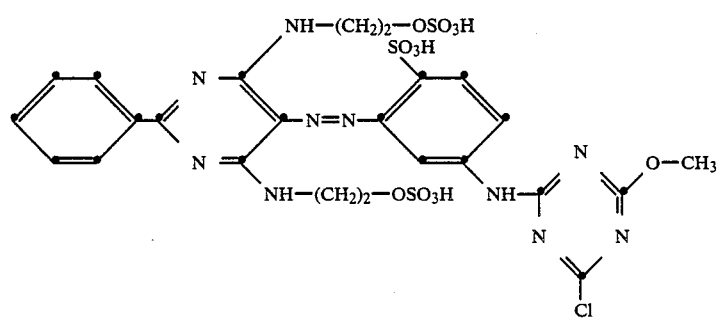 | Golden yellow |
| 35 | 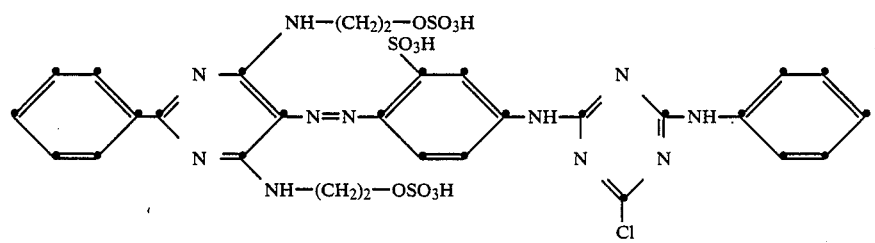 | Golden yellow |
| 36 | 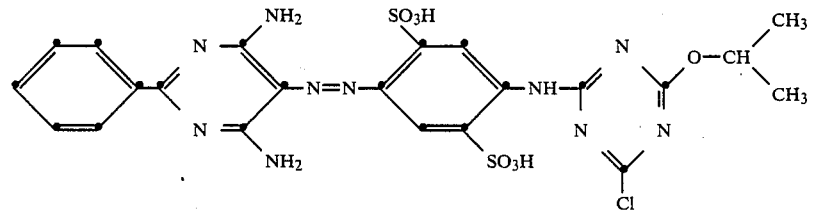 | Orange |
| 37 | 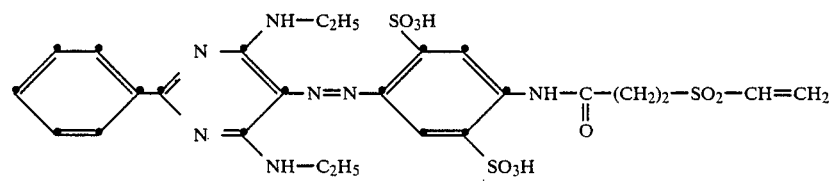 | Orange |

TABLE 1-continued
| Example No. | Structure | Shade |
|---|---|---|
| 38 | | Yellow |
| 39 | | Orange |
| 40 | | Brown |
| 41 | | Brown |
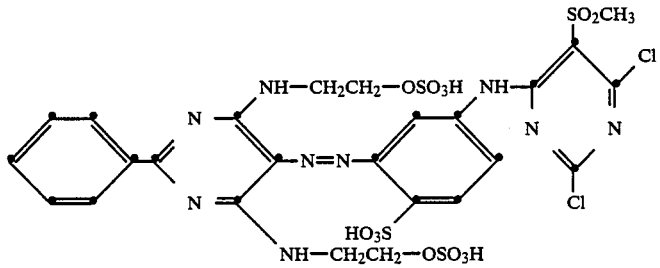
| Example No. | A | Shade |
|---|---|---|
| 42 | $-NH-(CH_2)_2-SO_2-CH=CH_2$ | Golden yellow |
| 43 | $-NH-(CH_2)_3-SO_2-CH=CH_2$ | Golden yellow |
| 44 | $-NH-(CH_2)_2-O-(CH_2)_2-SO_2-CH=CH_2$ | Golden yellow |
| 45 | $-N\begin{matrix}CH_2-CH_2-SO_2-CH=CH_2\\ CH_2-CH_2-SO_2-CH=CH_2\end{matrix}$ | Golden yellow |

TABLE 1-continued

| | A | Shade |
|---|---|---|
| 46 | −N(piperidine)−(CH₂)₃−SO₂−(CH₂)₂−Cl | Golden yellow |
| 47 | −NH−C₆H₄−SO₂−(CH₂)₂−OSO₃H | Golden yellow |
| 48 | −NH−C₆H₄−SO₂−CH=CH₂ | Golden yellow |
| 49 | −NH−C₆H₄−C(O)−NH−(CH₂)₂−SO₂−CH=CH₂ | Golden yellow |
| 50 | −NH−C₆H₄−C(O)−NH−(CH₂)₂−SO₂−(CH₂)₂−OSO₃H | Golden yellow |
| 51 | −NH−C₆H₄−SO₂−CH₂−CH₂−OSO₃H | Golden yellow |
| 52 | −NH−CH₂−CH(SO₂−CH=CH₂)−(CH₂)₃−SO₂−CH=CH₂ | Golden yellow |
| 53 | −NH−(CH₂)₂−NH−(CH₂)₂−SO₂−CH=CH₂ | Golden yellow |
| 54 | −N(CH₃)−(CH₂)₂−SO₂−CH=CH₂ | Golden yellow |
| 55 | −NH−(CH₂)₅−SO₂−CH=CH₂ | Golden yellow |
| 56 | −N((CH₂)₃−SO₂−CH=CH₂)₂ | Golden yellow |
| 57 | −N(morpholino)O | Golden yellow |

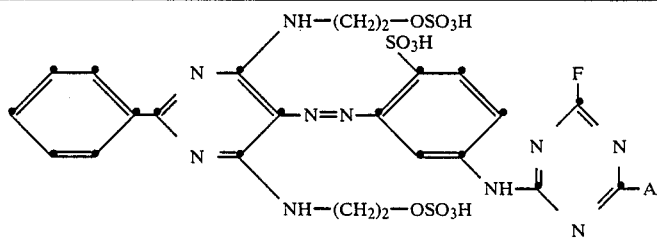

| Example No. | A | Shade |
|---|---|---|

TABLE 1-continued

| | | |
|---|---|---|
| 58 | —NH—(CH$_2$)$_2$—SO$_2$—CH=CH$_2$ | Golden yellow |
| 59 | —NH—(CH$_2$)$_2$—O—(CH$_2$)$_2$—SO$_2$—CH=CH$_2$ | Golden yellow |
| 60 | —N(CH$_3$)—(CH$_2$)$_4$—SO$_2$—CH=CH$_2$ | Golden yellow |
| 61 | —N[(CH$_2$)$_2$—SO$_2$—CH=CH$_2$]$_2$ | Golden yellow |
| 62 | —NH—CH$_2$—CH(SO$_2$—CH=CH$_2$)—(CH$_2$)$_3$—SO$_2$—CH=CH$_2$ | Golden yellow |
| 63 | —NH—(CH$_2$)$_5$—SO$_2$—CH=CH$_2$ | Golden yellow |
| 64 | —NH—(CH$_2$)$_2$—NH—(CH$_2$)$_2$—SO$_2$—CH=CH$_2$ | Golden yellow |
| 65 | —N(piperazinyl)—(CH$_2$)$_2$—SO$_2$—CH=CH$_2$ | Golden yellow |
| 66 | —NH—C$_6$H$_4$—SO$_2$—CH=CH$_2$ | Golden yellow |
| 67 | —N(C$_2$H$_5$)—C$_6$H$_4$—SO$_2$—CH=CH$_2$ | Golden yellow |
| 68 | —NH—C$_6$H$_4$—NH—C(O)—(CH$_2$)$_3$—SO$_2$—CH=CH$_2$ | Golden yellow |
| 69 | —NH—C$_6$H$_4$—C(O)—NH—(CH$_2$)$_2$—SO$_2$—CH=CH$_2$ | Golden yellow |
| 70 | —NH—C$_6$H$_4$—CH$_2$—C(O)—NH—(CH$_2$)$_2$—SO$_2$—CH=CH$_2$ | Golden yellow |
| 71 | —NH—(8-HO$_3$S-naphth-2-yl)—SO$_2$—CH=CH$_2$ | Golden yellow |

TABLE 1-continued
| | | |
|---|---|---|
| 72 | 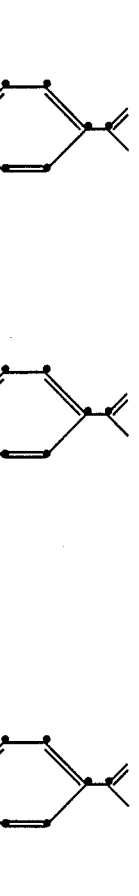 | Golden yellow |
| 73 | 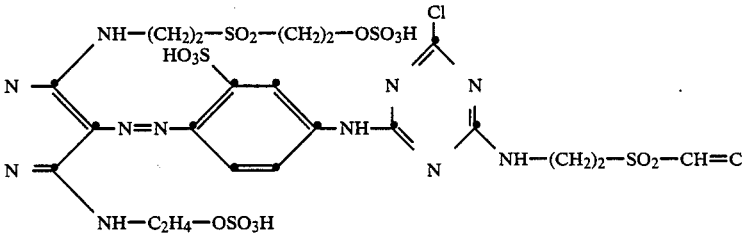 | Orange |
| 74 | 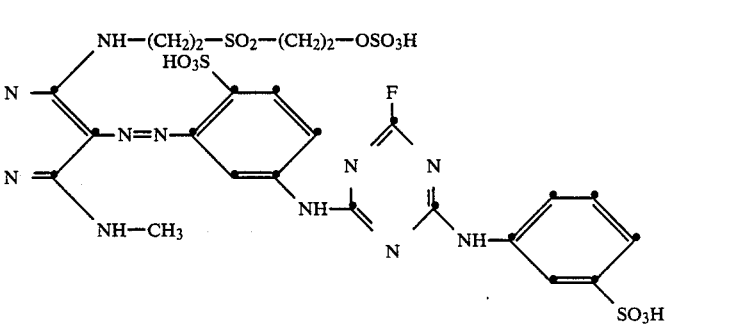 | Golden yellow |
| 75 | 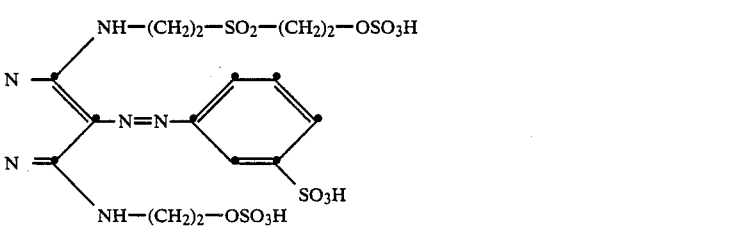 | Yellow |
| 76 | 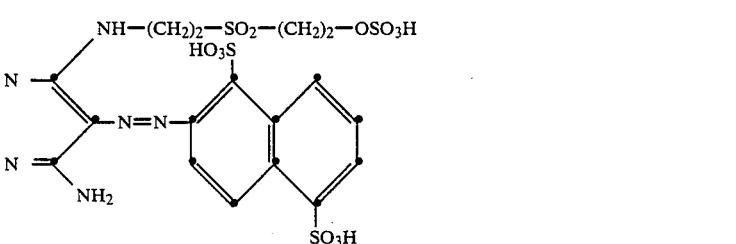 | Golden yellow |
| 77 | 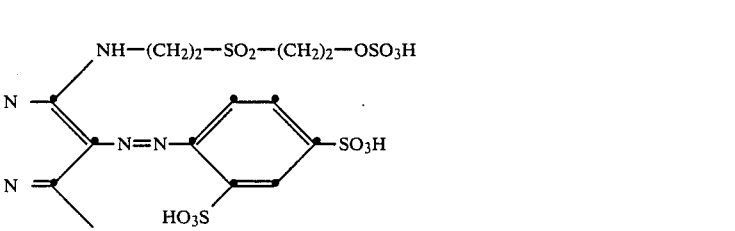 | Yellow |

TABLE 1-continued
| | | Shade |
|---|---|---|
| 78 | 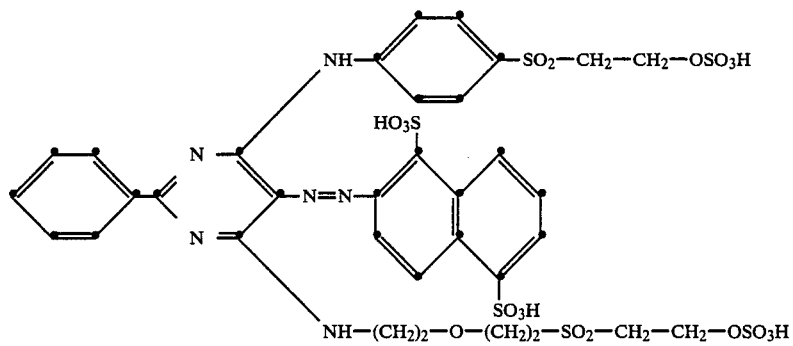 | Golden yellow |
| 79 | 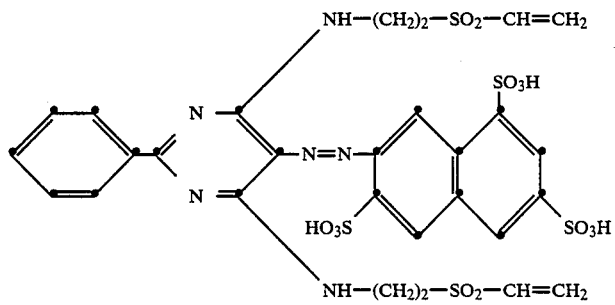 | Orange |
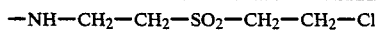
| Example No. | A | Shade |
|---|---|---|
| 80 | —NH—CH$_2$—CH$_2$—SO$_2$—CH$_2$—CH$_2$—Cl | Golden yellow |
| 81 | 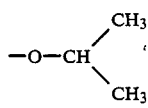 | Golden yellow |
| 82 | 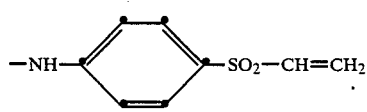 | Golden yellow |
| 83 | 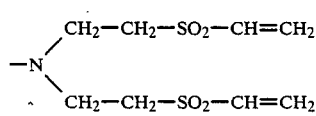 | Golden yellow |
| 84 | 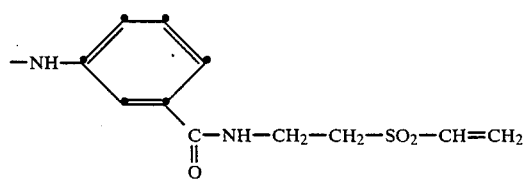 | Golden yellow |

TABLE 1-continued

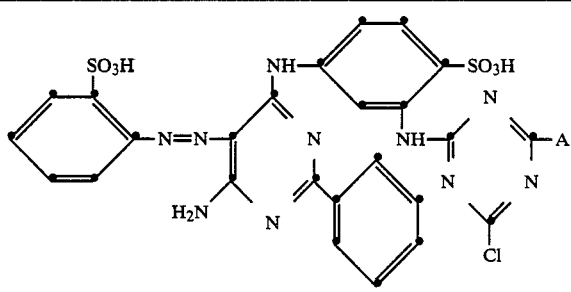

| Example No. | A | Shade |
|---|---|---|
| 85 | —NH—C₆H₄—SO₃H (4-sulfophenylamino) | yellow |
| 86 | —NH—CH₂—CH₂—O—CH₂—SO₂—CH=CH₂ | yellow |
| 87 | —NH—CH₂—CH(SO₂—CH=CH₂)—CH₂—CH₂—CH₂—SO₂—CH=CH₂ | yellow |
| 88 | —NH—C₆H₄—SO₂—CH₂—CH₂—OSO₃H | yellow |
| 89 | —N(C₂H₅)—C₆H₄—SO₂—CH=CH₂ | yellow |
| 90 | —NH—C₆H₄—C(O)—NH—CH₂—CH₂—SO₂—CH=CH₂ | yellow |

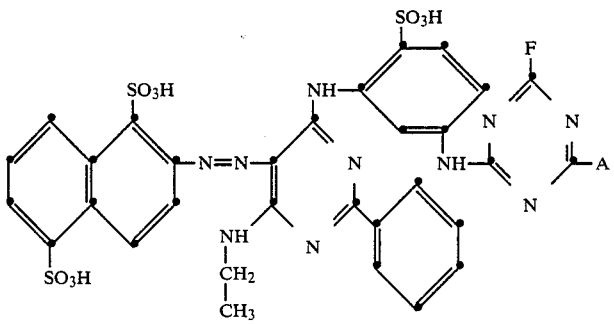

| Example No. | A | Shade |
|---|---|---|
| 91 | —N(C₂H₅)—C₆H₅ | Golden yellow |
| 92 | —NH—(CH₂)₂—SO₂—CH=CH₂ | Golden yellow |
| 93 | —NH—(CH₂)₅—SO₂—CH=CH₂ | Golden yellow |
| 94 | —NH—(CH₂)₂—O—(CH₂)₂—SO₂—CH=CH₂ | Golden yellow |

TABLE 1-continued

| No. | Structure | Color |
|---|---|---|
| 95 | −N(CH₂CH₂)₂O (morpholino) | Golden yellow |
| 96 | −NH−C₆H₄−SO₃H | Golden yellow |
| 97 | −NH−C₆H₄−SO₂−CH₂CH₂Cl | Golden yellow |
| 98 | −NH−C₆H₄−C(O)−NH−(CH₂)₂−SO₂−CH=CH₂ | Golden yellow |
| 99 | −NH−C₆H₄−C(O)−NH−(CH₂)₂−SO₂−CH=CH₂ | Golden yellow |
| 100 | −NH−C₆H₄−NH−C(O)−(CH₂)₃−SO₂−CH=CH₂ | Golden yellow |
| 101 | −NH−C₆H₄−CH₂−C(O)−NH−(CH₂)₂−SO₂−CH=CH₂ | Golden yellow |
| 102 | −NH−C₆H₄−SO₂−CH=CH₂ | Golden yellow |
| 103 | −N(C₂H₅)−C₆H₄−SO₂−CH=CH₂ | Golden yellow |
| 104 | −NH−(CH₂)−C₆H₄−SO₂−CH=CH₂ | Golden yellow |

TABLE 1-continued

[Structure: naphthalene with three SO₃H groups and HO₃S, connected via N=N to a complex chromophore containing NH, N, CH₃, NH-CH₂-CH₃ groups, linked to two phenyl rings, one bearing NH-A]

| Example No. | A | Shade |
|---|---|---|
| 105 | [triazine with F, NH-CH₂-CH₂-OH] | orange |
| 106 | [triazine with Cl, NH-(CH₂)₂-SO₂-CH=CH₂] | orange |
| 107 | [pyrimidine with Cl, F, F] | orange |
| 108 | [pyrimidine with SO₂CH₃, Cl, Cl] | orange |
| 109 | [triazine with SCH₃, Cl] | orange |
| 110 | [triazine with NH-phenyl, Cl] | orange |

TABLE 1-continued

| No. | Structure | Shade |
|---|---|---|
| 111 | (triazine with F and NH-phenyl-SO$_2$-CH=CH$_2$) | orange |
| 112 | (triazine with two Cl) | orange |

(Bisazo structure: A—NH—[phenyl with SO$_3$H]—N=N—C(NH$_2$)=C(CH$_3$)—[with NH—phenyl-SO$_3$H and N=N-phenyl pyrazolone system])

| Example No. | A | Shade |
|---|---|---|
| 113 | H$_2$C=HC—O$_2$S—(H$_2$C)$_2$—O—(H$_2$C)$_2$—HN—(triazine with F) | yellow |
| 114 | H$_2$C=HC—O$_2$S—[phenyl]—HN—(triazine with F) | yellow |
| 115 | (pyrimidine with Cl, F, F) | yellow |
| 116 | (H$_2$C=HC—O$_2$S—(H$_2$C)$_2$)$_2$N—(triazine with Cl) | yellow |

TABLE 1-continued
| | | Shade |
|---|---|---|
| 117 | 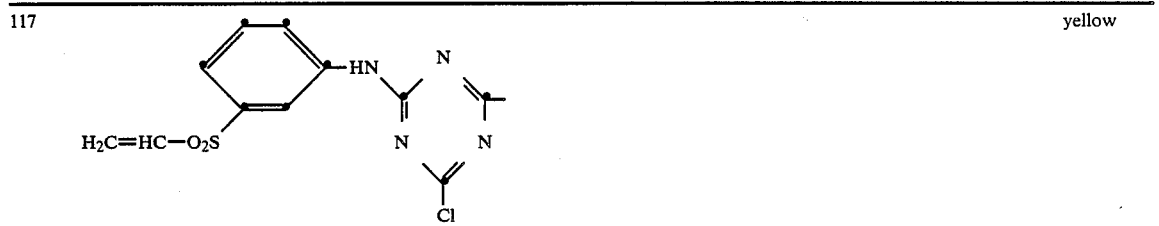 | yellow |
| 118 |  | yellow |
| 119 |  | yellow |
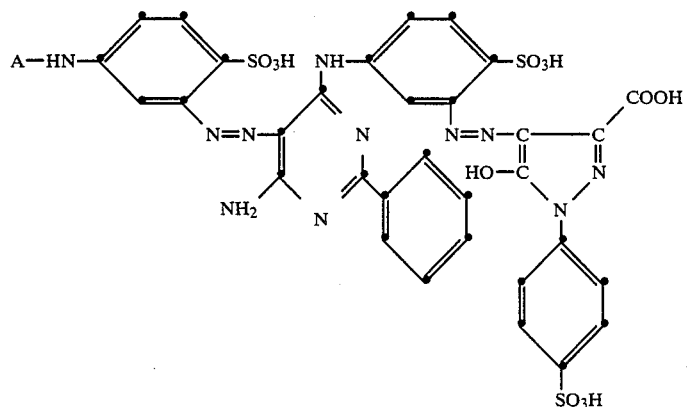
| Example No. | A | Shade |
|---|---|---|
| 120 | 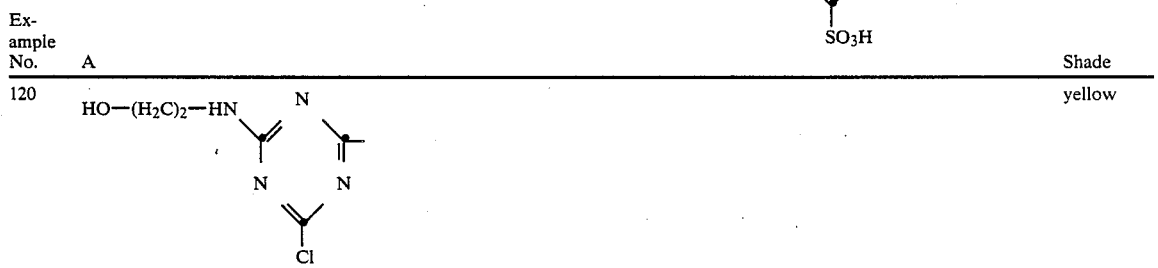 | yellow |
| 121 |  | yellow |
| 122 |  | yellow |

TABLE 1-continued

| Ex. No. | Structure | Shade |
|---|---|---|
| 123 | H₂C=HC—O₂S—[phenyl]—HN—C(=N—C(F)=N—)N | yellow |
| 124 | [pyrimidine with Cl, F, F substituents] | yellow |
| 125 | CH₃-HC(CH₃)-O—[triazine with Cl] | yellow |
| 126 | H₂C=HC—O₂S—(H₂C)₂—C(=O)— | yellow |
| 127 | [chromophore with CH₃-phenyl, NH—(CH₂)₂—OSO₃H groups, N=N—phenyl—SO₂—(CH₂)₂—OSO₃H] | Golden yellow |
| 128 | [chromophore with SO₃H-phenyl, NH—(CH₂)₂—CH₃, NH—(CH₂)₂—OSO₃H, N=N—phenyl—SO—CH=CH₂] | Golden yellow |
| 129 | [chromophore with Cl-phenyl, NH—(CH₂)₂—OSO₃H groups, N=N—phenyl with SO₃H and NH—C(=O)—(CH₂)₃—SO₂—CH=CH₂] | Golden yellow |

TABLE 1-continued

| No. | Structure | Color |
|---|---|---|
| 130 | (structure with CF₃-substituted phenyl, NH—(CH₂)₂—OSO₃H, azo-linked to phenyl with —C(O)—NH—(CH₂)₂—SO₂—CH=CH₂, and NH-phenyl-SO₃H) | Golden yellow |
| 131 | (structure with (CH₃)₂CH-phenyl, two NH—(CH₂)₂—OSO₃H groups, azo-linked to SO₃H-phenyl—SO₂—CH=CH₂) | Golden yellow |
| 132 | (furanyl structure with NH—(CH₂)₂—OSO₃H, NH—CH₃, azo-linked to phenyl with SO₃H and —C(O)—NH—(CH₂)₂—SO₂—CH=CH₂) | Golden yellow |
| 133 | (naphthyl structure with NH—(CH₂)₂—OSO₃H, azo-linked to phenyl with SO₃H and —SO₂—CH=CH₂, and NH-phenyl-SO₃H) | Golden yellow |

---

What is claimed is:

1. A reactive dye of the formula

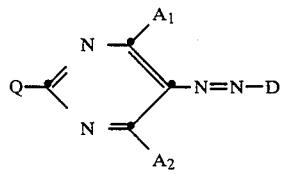
(1)

in which D is the radical of a diazo component, Q is phenyl unsubstituted or substituted by C₁-C₄alkyl, C₁-C₄alkoxy, halogen, nitro, cyano, C₁-C₄alkoxycarbonyl, C₁-C₄alkylsulfonyl, sulfo or trihalomethyl; 1- or 2- naphthyl; or unsubstituted or C₁-C₄alkyl, nitro, cyano, C₁-C₄alkoxycarbonyl or C₁-C₄alkylthio substituted furanyl, thienyl, thiazolyl, oxazolyl, isothiazolyl, benzothiazolyl, benzoisothiazolyl, pyrazolyl, imidazolyl, 1,2,3-triazolyl, 1,2,4-triazolyl, 1,2,4-thiadiazolyl, 1,3,4-thiadiazolyl or 1,3,5-triazinyl, and A₁ and A₂ independently of one another are a radical of the formula

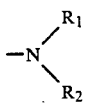
(1a)

in which R₁ and R₂ independently of one another are hydrogen; C₁-C₆ alkyl unsubstituted or substituted by hydroxyl, sulfo, sulfato, carboxyl, cyano, halogen, C₁-C₄alkoxycarbonyl, C₁-C₄alkanoyloxy or carbamoyl and uninterrupted or with the exception of methyl interrupted by —O— or —NR₄— wherein R₄ is hydrogen or C₁-C₄alkyl; or naphthyl or phenyl each of which is unsubstituted or substituted by sulfo, carboxyl, C₁-C₄alkyl, C₁-C₄-alkoxy, halogen or a group —N=N—K wherein K is a coupling component benzene, naphthalene or heterocyclic radical; or R₁ and R₂ together with the N atom form a piperidinyl, piperazinyl or pyrrolidinyl radical, with the proviso that at least one of the radicals A₁, A₂ and D is further substituted by a fiber-reactive radical selected from the group consisting of 2,3-dichloroquinoxaline-6-carbonylamino, 2,4-dichloropyrimidine-5-carbonylamino,

—SO₂—Z, (2)

—W—alk-SO₂—Z, (2a)
　　　|
　　　R

—W—alk-E—alk'-SO₂—Z, (2b)

—alk-W—alk'-SO₂—Z, (2c)
　　　　|
　　　　R

—O—alk-W—alk'-SO₂—Z, (2d)
　　　　　|
　　　　　R

—W—arylen-N—alk-SO₂—Z, (2e)
　　　　　|　　|
　　　　　R₃　R

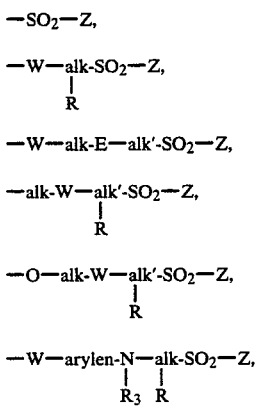 (3)

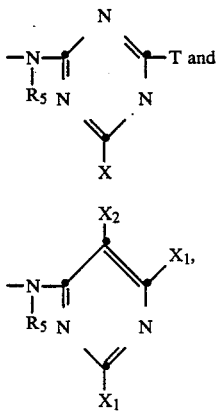 (5)

in which W is —CONH— or —NHCO—, R₁ is hydrogen, C₁-C₄alkyl unsubstituted or substituted by hydroxyl, sulfo, sulfato, carboxyl or cyano or is a radical of the formula —N—alk-SO₂—Z, (4)
 |
 R₃
 |
 R —N—alk-E—alk'-SO₂—Z, (4a)
 |
 R₅

—N—arylen-SO₂—Z, (4b)
 |
 R₅

—N—arylen-(alk)ₚ-W—alk'-SO₂—Z or (4c)
 |
 R₅

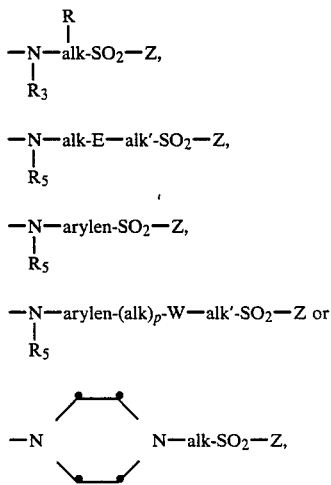 (4d)

R is hydrogen, hydroxyl, sulfo, sulfato, carboxyl, cyano, halogen, C₁-C₄alkoxycarbonyl, C₁-C₄alkanoyloxy, carbamoyl or is the group —SO₂—Z, Z is —CH=CH₂ or —CH₂—CH₂—Y, Y is —Cl, —Br, —F, —OSO₃H, —SSO₃H, —OC—CH₃, —OCO—C₆H₅, —OPO₃H₂, —OCO—CCl₃, —OCO—CHCl₂, —O-CO—CH₂Cl, OSO₂—R*, in which R* is C₁-C₄alkyl or phenyl unsubstituted or substituted by C₁-C₄alkyl, or —OSO₂—N(C₁-C₄alkyl)₂, E is —O— or —NR₄, R₄ is hydrogen or C₁-C₄alkyl, alk and alk' independently of one another are C₁-C₆alkylene, arylene is phenylene or naphthylene unsubstituted or substituted by sulfo, carboxyl, C₁-C₄alkyl, C₁-C₄alkoxy or halogen, R₅ is hydrogen or C₁-C₄alkyl unsubstituted or substituted by carboxyl, cyano, hydroxyl, sulfo or sulfato, X is fluorine, chlorine, bromine, sulfo, C₁-C₄alkylsulfonyl or phenylsulfonyl, T independently has the definition of X or is a non-reactive substituent selected from the group consisting of hydroxy; C₁-C₄alkoxy; C₁-C₄alkylthio; amino; N—C₁-C₄alkylamino or N,N—di—C₁-C₄alkylamino, in which alkyl is unsubstituted or substituted by sulfo, sulfato, hydroxyl, carboxyl or phenyl; cyclohexylamino; morpholino; phenylamino, N—C₁-C₄alkyl-N-phenylamino or naphthylamino, in which phenyl or naphthyl is unsubstituted or substituted by C₁-C₄alkyl, C₁-C₄alkoxy, carboxyl, sulfo or halogen or is a reactive radical of the formula

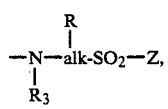 (4)

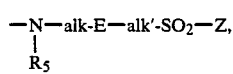 (4a)

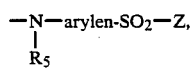 (4b)

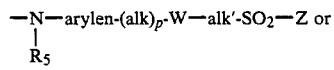 (4c)

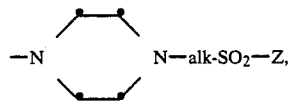 (4d)

in which R, R₃, R₅, E, W, Z, alk, alk' and arylene are as defined above and p is 0 or 1, one of the radicals X₁ independently has the definition of X and the other radical X₁ has the definition of T, and X₂ is nitro, cyano, C₁-C₄alkylsulfonyl, carboxyl, chlorine hydroxyl, C₁-C₄alkoxysulfonyl, C₁-C₄alkylsulfinyl, C₁-C₄alkoxycarbonyl or C₁-C₄alkanoyl.

2. A reactive dye according to claim 1, wherein Q is phenyl unsubstituted or substituted by methyl, trifluoromethyl, methoxy, sulfo, nitro, chlorine or bromine, or is 1- or 2-naphthyl or furanyl, thienyl or benzothiazolyl.

3. A reactive dye according to claim 2, wherein Q is phenyl.

4. A reactive dye according to claim 1, wherein D is an aminobenzene, aminonaphthalene, phenylazoaminobenzene, naphthylazoaminobenzene, phenylazoaminonaphthalene or naphthylazoaminonaphthalene radical each of which is unsubstituted or substituted by C₁-C₄alkyl, C₁-C₄alkoxy, amino, N-mono- or N,N-di—C₁-C₄alkylamino - the alkyl part being unsubstituted or substituted by —OH, —OCOCH₃, —SO₃H, —OSO₃H, —CN or halogen-, phenylamino, C₁-C₄alkanoylamino, benzoylamino, C₁-C₄alkoxycarbonyl, nitro, cyano, trifluoromethyl, halogen, hydroxyl, carboxyl, sulfo, sulfomethyl, sulfamoyl, N-mono- or N,N-di-C₁-C₄alkylsulfamoyl, N-phenylsulfamoyl, carbamoyl, N-mono- or N,N-di-C₁-C₄alkylcarbamoyl, ureido, C₁-C₄alkylsulfonyl or a fiber-reactive radical.

5. A reactive dye according to claim 1, wherein D is substituted by a fiber-reactive radical.

6. A reactive dye according to claim 1, wherein D is substituted by a fiber-reactive radical of the formula (2) or (2a) in which alk is $C_1$-$C_4$alkylene.

7. A reactive dye according to claim 1, wherein Y is —Cl, —$OSO_3H$, —$SSO_3H$, —OCO—$CH_3$, —O—CO—$C_6H_5$ or —$OPO_3H_2$.

8. A reactive dye according to claim 1, wherein D is substituted by a fiber-reactive radical of the formula (3) and T is a group of the formula

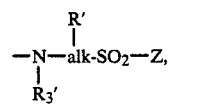 (4')

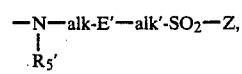 (4a')

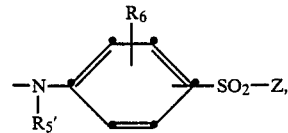 (4b')

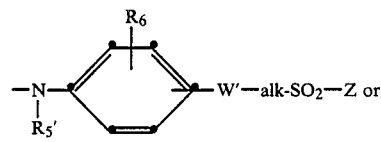 (4c')

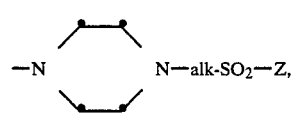 (4d)

in which W' is —$COR_5'$ or —$NR_5'CO$—, R' is hydrogen or the group —$SO_2$—Z, $R_3'$ is hydrogen, $C_1$-$C_4$alkyl or the group -alk—$SO_2$—Z, $R_5'$ is hydrogen or $C_1$-$C_4$alkyl, E' is —O— or —NH— and $R_6$ is hydrogen, sulfo, carboxyl, chlorine, methoxy or methyl, and alk and alk' independently of one another are $C_1$-$C_4$alkylene.

9. A reactive dye according to claim 1, wherein T as a non-reactive substituent is amino, N—$C_1$-$C_4$alkylamino, which is unsubstituted in the alkyl part or is substituted by hydroxyl, sulfato or sulfo, or is morpholino, phenylamino or N—$C_1$-$C_4$alkyl-N-phenylamino, in which each of the phenyl groups is unsubstituted or substituted by sulfo, methyl or methoxy.

10. A reactive dye according to claim 1, wherein D is substituted by a reactive radical of the formula (5), in which $X_1$ is chlorine or fluorine and $X_2$ is chlorine, cyano, formyl or methylsulfonyl.

11. A reactive dye according to claim 1, wherein D is an aminobenzene or aminonaphthalene radical which is substituted by a reactive radical of the formula (2), (2a) or (3), and which is further unsubstituted or substituted by sulfo, acetylamino, methyl, methoxy, chlorine or bromine.

12. A reactive dye according to claim 1, wherein D is an aminobenzene or aminonaphthalene radical unsubstituted or substituted by sulfo, carboxyl, $C_1$-$C_4$alkoxy, $C_1$-$C_4$alkyl, $C_1$-$C_4$alkanoylamino or halogen.

13. A reactive dye according to claim 1, wherein $R_1$ and $R_2$ independently of one another are hydrogen; $C_1$-$C_6$alkyl unsubstituted or substituted by hydroxyl, sulfo, sulfato, carboxyl, cyano, halogen, $C_1$-$C_4$alkoxycarbonyl, $C_1$-$C_4$alkanoyloxy, carbamoyl or —$SO_2Z$, alkyl with the exception of methyl being uninterrupted or interrupted by O— or —$NR_4$—; or are phenyl or naphthyl unsubstituted or substituted by sulfo, carboxyl, $C_1$-$C_4$alkyl, $C_1$-$C_4$alkoxy, halogen, a reactive radical selected from the group consisting of 2,3-dichloroquinoxaline-6-carbonylamino, 2,4-dichloropyrimidine-5-carbonylamino, a radical of the formula (2), (2a), (3) and (5), or a group —N=N—K, where K is a coupling component benzene, naphthalene or heterocyclic radical, or $R_1$ and $R_2$ together with the nitrogen atom form a piperidinyl, piperazinyl or pyrrolidinyl radical which is unsubstituted or substituted by a radical of the formula —(alk)$_p$—$SO_2$—Z.

14. A reactive dye according to claim 1, wherein $A_1$ or $A_2$ is a group of the formula

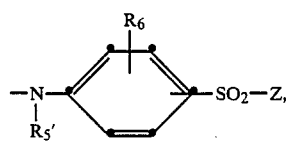 (4b')

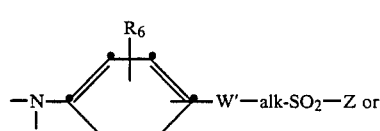 (4c')

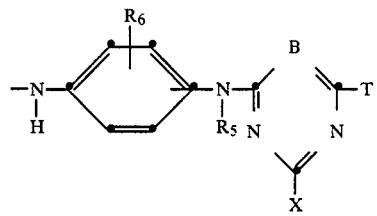 (3a)

in which W' is —$COR_5'$ or —$NR_5'CO$—, $R_5'$ is hydrogen or $C_1$-$C_4$alkyl, $R_6$ is hydrogen, methyl, sulfo, chlorine, methoxy or carboxyl and B is a group

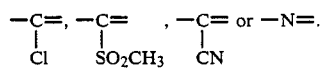

15. A reactive dye according to claim 1, wherein $A_1$ or $A_2$ is a radical of the formula (1a), in which $R_1$ and $R_2$ independently of one another are hydrogen or $C_1$-$C_4$alkyl unsubstituted or substituted by hydroxyl, sulfo, sulfato, carboxyl, cyano or the group —$SO_2Z$ and uninterrupted or interrupted by —O—.

16. A reactive dye according to claim 15, wherein one of the radicals $R_1$ or $R_2$ is hydrogen.

17. A reactive dye according to claim 1, wherein $A_1$ is a radical of the formula

 (1a)

 (4')

$$-\underset{\underset{R_5'}{|}}{N}-alk\text{-}E'-alk'\text{-}SO_2-Z \qquad (4a')$$

in which $R_1$ is hydrogen and $R_2$ is hydrogen or $C_1$-$C_4$alkyl unsubstituted or substituted by hydroxyl, sulfo or sulfato, $R'$, $R_3'$ and $R_5'$ are each hydrogen, $E'$ is —O— and alk and alk' independently of one another are $C_1$-$C_4$alkylene, and $A_2$ independently has the definition of $A_1$ or is phenylamino unsubstituted or substituted by sulfo, chlorine, methoxy, carboxyl or a radical of the formula (2), (2a) or (3).

18. A reactive dye according to claim 1, wherein $A_1$ and $A_2$ independently of one another are amino, N-$C_1$-$C_4$alkylamino, in which alkyl is unsubstituted or substituted by hydroxyl, sulfato or sulfo, or are phenylamino, in which phenyl is unsubstituted or substituted by sulfo, carboxyl, methyl, methoxy, chlorine or a radical of the formula

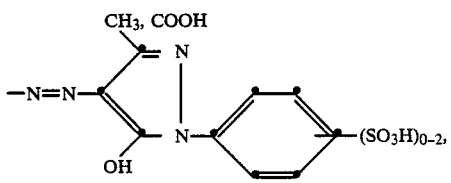

(8')

D is an aminobenzene or aminonaphthalene radical which is substituted by a reactive radical of the formula (2), (2a) or (3) and which is further unsubstituted or substituted by sulfo, acetylamino, methyl, methoxy, chlorine or bromine and Q is phenyl unsubstituted or substituted by methyl, trifluoromethyl, methoxy, sulfo, nitro, chlorine or bromine, or is 1- or 2-naphthyl, furanyl, thienyl or benzothiazolyl.

19. A reactive dye according to claim 1, wherein $A_1$ is a radical of the formula $$-N\begin{matrix}\nearrow R_1 \\ \searrow R_2\end{matrix} \qquad (1a)$$

$$-\underset{\underset{R_3'}{|}}{N}-alk\text{-}SO_2-Z \text{ or} \qquad (4')$$

$$-\underset{\underset{R_5'}{|}}{N}-alk\text{-}E'-alk'\text{-}SO_2-Z \qquad (4a')$$

in which $R_1$ is hydrogen and $R_2$ is hydrogen or $C_1$-$C_4$alkyl unsubstituted or substituted by hydroxyl, sulfo or sulfato, $R'$, $R_3'$ and $R_5'$ are each hydrogen, $E'$ is —O— and alk and alk' independently of one another are $C_1$-$C_4$alkylene, and $A_2$ independently has the definition of $A_1$ or is phenylamino unsubstituted or substituted by sulfo, chlorine, methoxy, carboxyl or a radical of the formula (2), (2a) or (3), Q is phenyl unsubstituted or substituted by methyl, trifluoromethyl, methoxy, sulfo, nitro, chlorine or bromine, or is 1- or 2-naphthyl, furanyl, thienyl or benzothiazolyl, and D is an aminobenzene or aminonaphthalene radical which is unsubstituted or substituted by sulfo, carboxyl, $C_1$-$C_4$alkoxy, $C_1$-$C_4$alkyl, $C_1$-$C_4$alkanoylamino, halogen or a reactive radical of the formula (2), (2a) or (3).

* * * * *